United States Patent
Imamura et al.

(10) Patent No.: US 11,161,352 B2
(45) Date of Patent: Nov. 2, 2021

(54) INK JET TEXTILE PRINTING INK

(71) Applicant: Seiko Epson Corporation, Tokyo (JP)

(72) Inventors: Koji Imamura, Shiojiri (JP); Homare Kuribayashi, Ikeda (JP); Shotaro Watanabe, Suwa (JP); Kei Hiruma, Chino (JP); Masato Hanamura, Shiojiri (JP); Jungo Asano, Shiojiri (JP)

(73) Assignee: Seiko Epson Corporation

( * ) Notice: Subject to any disclaimer, the term of this patent is extended or adjusted under 35 U.S.C. 154(b) by 35 days.

(21) Appl. No.: 16/658,509

(22) Filed: Oct. 21, 2019

(65) Prior Publication Data

US 2020/0122486 A1    Apr. 23, 2020

(30) Foreign Application Priority Data

Oct. 22, 2018  (JP) .............................. JP2018-198210

(51) Int. Cl.
 *B41J 3/407*  (2006.01)
 *C09D 11/324*  (2014.01)
 (Continued)

(52) U.S. Cl.
 CPC ............... *B41J 3/4078* (2013.01); *B41J 2/01* (2013.01); *B41J 2/2107* (2013.01); *C09D 11/324* (2013.01); *C09D 11/328* (2013.01)

(58) Field of Classification Search
 CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2002/16502; B41J 25/001; B41J 25/34; B41J 25/003; B41J 25/312; B41J 2025/008; B41J 2202/21; B41J 2/17596; B41J 2/16508; B41J 2/1652; B41J 2/16538; B41J 2/175;
(Continued)

(56) References Cited

U.S. PATENT DOCUMENTS

| | | | |
|---|---|---|---|
| 2006/0205840 A1* | 9/2006 | Kato | ..................... C09D 11/40 |
| | | | 523/160 |
| 2007/0126831 A1* | 6/2007 | Suzuki | ................. C08F 220/30 |
| | | | 347/100 |

FOREIGN PATENT DOCUMENTS

JP    2009-046544 A    3/2009

* cited by examiner

*Primary Examiner* — Manish S Shah
(74) *Attorney, Agent, or Firm* — Harness, Dickey & Pierce, P.L.C.

(57) ABSTRACT

An ink jet textile printing ink contains 5% by mass to 20% by mass of a water-soluble dye, water, a water-soluble organic solvent, and active carbon particles. The active carbon particles include particles having a particle size of 50 nm to 1000 nm, and the active carbon particles having the particle size of 50 nm to 1000 nm are contained in a proportion of 500 to 300000 particles per milliliter. Also, the active carbon particles may include particles having a particle size of 50 nm to 200 nm, and the active carbon particles having a particle size of 50 nm to 200 nm may be contained in a proportion of 2000 to 30000 particles per milliliter. The active carbon particles may have an average particle size in the range of 100 nm to 600 nm.

8 Claims, 15 Drawing Sheets

(51) Int. Cl.
  *C09D 11/328* (2014.01)
  *B41J 2/21* (2006.01)
  *B41J 2/01* (2006.01)
(58) Field of Classification Search
  CPC ...... B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
  See application file for complete search history.

INK JET TEXTILE PRINTING INK

The present application is based on, and claims priority from, JP Application Serial Number 2018-198210, filed Oct. 22, 2018, the disclosure of which is hereby incorporated by reference herein in its entirety.

BACKGROUND

1. Technical Field

The present disclosure relates to an ink jet textile printing ink.

2. Related Art

Ink jet printing is used in office and home printing machines, and the application thereof is expanding to commercial printing, textile printing, and the like.

From the viewpoint of forming desired patterns, ink jet inks that can be consistently ejected by an ink jet method are desirable.

JP-A-2009-46544 discloses an ink jet textile printing ink that is applied onto cloth as an ink jet ink containing a water-soluble dye.

In such an ink jet textile printing ink, however, the water-soluble dye is decomposed during the storage of the ink, affecting the ejection performance by the ink jet method.

SUMMARY

The subject matter disclosed herein is intended to solve such an issue and is implemented as the following embodiments.

[1] According to an aspect of the present disclosure, there is provided an ink jet textile printing ink containing 5.0% by mass to 20.0% by mass of a water-soluble dye, water, a water-soluble organic solvent, and active carbon particles. The active carbon particles include particles having a particle size of 50 nm to 1000 nm, and the active carbon particles having the particle size of 50 nm to 1000 nm are contained in a proportion of 500 to 300000 particles per milliliter.

[2] In the ink jet textile printing ink of [1], the active carbon particles may include particles having a particle size of 50 nm to 200 nm, and the active carbon particles having the particle size of 50 nm to 200 nm may be contained in a proportion of 2000 to 30000 particles per milliliter.

[3] In the ink jet textile printing ink of [1] or [2], the active carbon particles may have an average particle size of 100 nm to 600 nm.

[4] In the ink jet textile printing ink of any one OF [1] to [3], the largest particle size of the active carbon particles may be 10000 nm or less.

[5] In the ink jet textile printing ink of any one of [1] to [4], the number of active carbon particles having a particle size of 2000 nm or more contained in 1 mL of the ink jet textile printing ink may be 60000 or less.

[6] The ink jet textile printing ink of any one of [1] to [5] may be ejected from an ink jet head having a pressure chamber and a circulation path enabling the ink jet textile printing ink in the pressure chamber to be circulated.

[7] The ink jet textile printing ink of [6] may be circulated at a flow rate with a ratio of 0.05:1 to 20:1 to the maximum ejection rate of the ink jet head.

DESCRIPTION OF EXEMPLARY EMBODIMENTS

Figure 1:
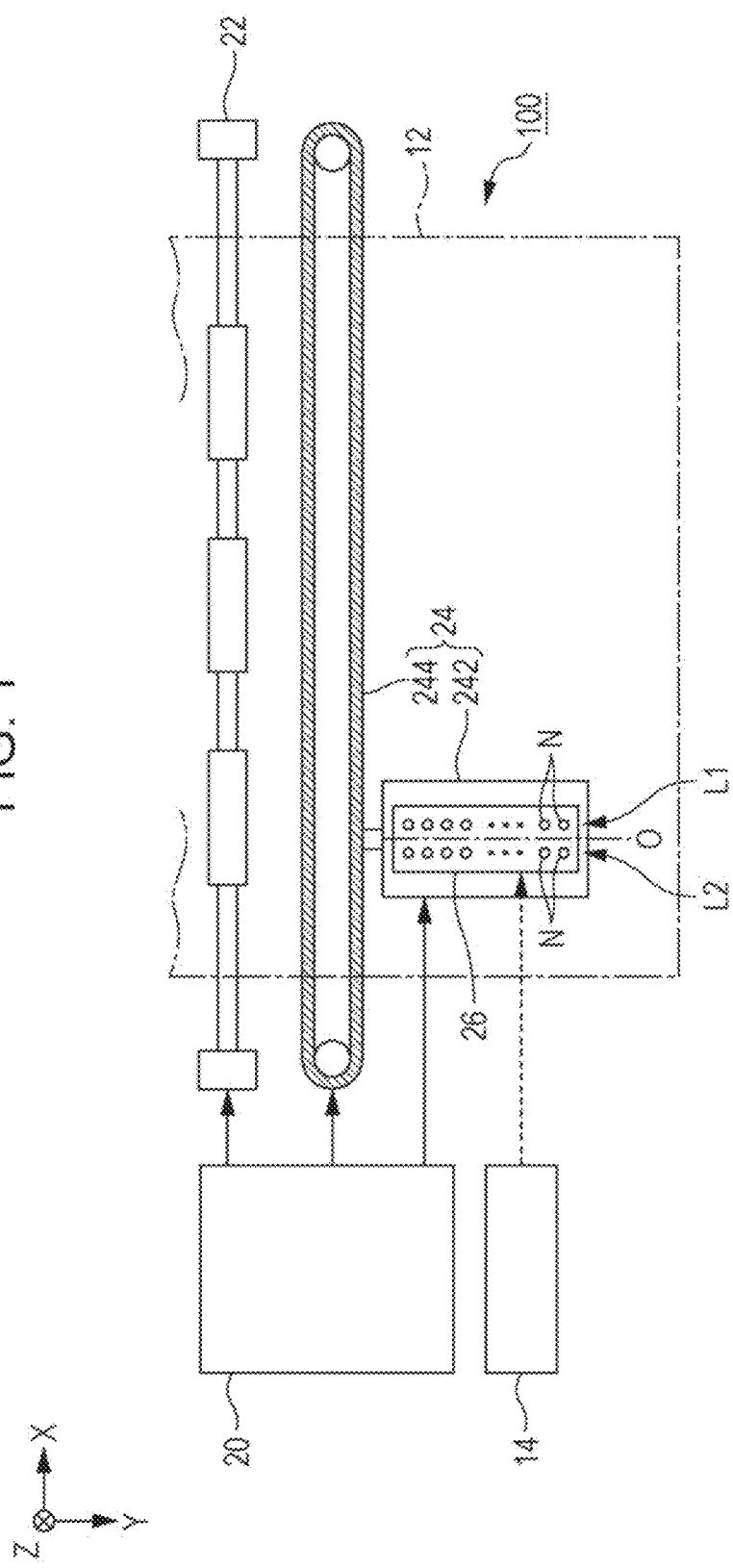
FIG. 1 is a configuration diagram of an ink jet apparatus according to a first embodiment of the present disclosure.

Preferred embodiments of the present disclosure will now be described in detail.

Ink Jet Textile Printing Ink

An ink jet textile printing ink according to the present disclosure will first be described.

The ink jet textile printing ink contains a water-soluble dye, water, a water-soluble organic solvent, and active carbon particles. The water-soluble dye content in the ink jet textile printing ink is in the range of 5.0% by mass to 20.0% by mass. The active carbon particles include particles having a particle size of 50 nm to 1000 nm, and the active carbon particles having such a particle size are contained in a proportion of 500 to 300000 particles per milliliter.

The ink jet textile printing ink having such a composition can be stably stored. Even if the water-soluble dye decomposes during a high-temperature storage or a long-term storage, the active carbon particles adsorb the decomposition product or the like effectively, thus reducing the adverse effect of the decomposition of the water-soluble dye on the ejection performance in an ink jet method. Consequently, the ink jet textile printing ink can be stable in storage and consistent in ejection.

On the other hand, inks not having the above-described composition do not produce satisfactory results. For example, when the content of active carbon particles having a particle size of 50 nm to 1000 nm in the ink jet textile printing ink is excessively low, foreign matter, such as the decomposition product of the water-soluble dye, cannot be sufficiently adsorbed. Thus, the ejection performance of such an ink jet textile printing ink is likely to change with time, and the storage stability of the ink jet textile printing ink cannot be satisfactory.

In contrast, when the content of active carbon particles having a particle size of 50 nm to 1000 nm is excessively high, the ejection consistency of the ink jet textile printing ink in an ink jet method is considerably affected by the active carbon particles and cannot be satisfactory. In addition, such an ink may produce an adverse effect on the color of the product dyed with the ink jet textile printing ink.

When the active carbon particles are excessively small and the content of the active carbon particles having a particle size of 50 nm to 1000 nm is excessively low even though the number of the active carbon particles in the ink jet textile printing ink satisfies the above requirement, foreign matter, such as the decomposition product of the water-soluble dye, cannot be sufficiently adsorbed. Thus, the ejection performance of such an ink jet textile printing ink is likely to change with time, and the storage stability of the ink jet textile printing ink cannot be satisfactory.

Also, when active carbon particles are excessively large and the content of the active carbon particles having a particle size of 50 nm to 1000 nm is excessively low even though the number of the active carbon particles in the ink jet textile printing ink satisfies the above requirement, the ejection consistency of the ink jet textile printing ink in an ink jet method is considerably affected by the active carbon particles and cannot be satisfactory.

When the water-soluble dye content in the ink jet textile printing ink is excessively low, the resulting product dyed with the ink jet textile printing ink is not likely to have a sufficient color density. In addition, the proportion of the active carbon particles to the water-soluble dye is increased even though the active carbon particles having a particle size in the above-described specific range are contained in a specific proportion, and the ink jet textile printing ink cannot be consistently ejected.

When the water-soluble dye content in the ink jet textile printing ink is excessively high, foreign matter, such as the decomposition product of the water-soluble dye, cannot be sufficiently adsorbed even though the active carbon particles having the specific particle size are contained in a specific proportion. Thus, the ejection performance of such an ink jet textile printing ink is likely to change with time, and the storage stability of the ink jet textile printing ink cannot be satisfactory.

In the ink jet textile printing ink, the lower limit of the content of the active carbon particles having a particle size of 50 nm to 1000 nm is 500 particles per milliliter and, in some embodiments, may be 1000 particles, 2000 particles, or 3000 particles, per milliliter. Also, in the ink jet textile printing ink, the upper limit of the content of the active carbon particles having a particle size of 50 nm to 1000 nm is 300000 particles per milliliter and, in some embodiments, may be 100000 particles, 50000 particles, or 30000 particles, per milliliter.

Such an ink jet textile printing ink can exhibit both high ejection consistency and high ejection stability.

The lower limit of the water-soluble dye content in the ink jet textile printing ink is 5.0% by mass and, in some embodiments, may be 6.0% by mass, 7.0% by mass, or 8.0% by mass. Also, the upper limit of the water-soluble dye content in the ink jet textile printing ink is 20.0% by mass and, in some embodiments, may be 18.0% by mass, 16.0% by mass, or 14.0% by mass.

Such an ink jet textile printing ink can exhibit both high ejection consistency and high ejection stability, and products dyed with such an ink jet textile printing ink can have a satisfactory color density.

Water-Soluble Dye

The ink jet textile printing ink disclosed herein contains a water-soluble dye.

In general, water-soluble dyes are soluble in water and have favorable dye affinity to cloth, particularly cloth containing cellulose fibers. Unfortunately, water-soluble dyes in solution are liable to decompose and are thus unstable in storage. In the embodiments of the present disclosure, however, the water-soluble dye is prevented from decomposing even though the dye is in the ink jet textile printing ink containing water. Consequently, the resulting ink jet textile printing ink can exhibit satisfactory storage stability and ejection consistency as well as advantageous features of the water-soluble dye.

The water-soluble dye may be a reactive dye, an acid dye, a direct dye, or the like, and such dyes may be used individually or in combination.

Examples of the reactive dye include C.I. Reactive Yellows 2, 3, 7, 15, 17, 18, 22, 23, 24, 25, 27, 37, 39, 42, 57, 69, 76, 81, 84, 85, 86, 87, 92, 95, 102, 105, 111, 125, 135, 136, 137, 142, 143, 145, 151, 160, 161, 165, 167, 168, 175, and 176; C.I. Reactive Oranges 1, 4, 5, 7, 11, 12, 13, 15, 16, 20, 30, 35, 56, 64, 67, 69, 70, 72, 74, 82, 84, 86, 87, 91, 92, 93, 95, and 107; C.I. Reactive Reds 2, 3, 3:1, 5, 8, 11, 21, 22, 23, 24, 28, 29, 31, 33, 35, 43, 45, 49, 55, 56, 58, 65, 66, 78, 83, 84, 106, 111, 112, 113, 114, 116, 120, 123, 124, 128, 130, 136, 141, 147, 158, 159, 171, 174, 180, 183, 184, 187, 190, 193, 194, 195, 198, 218, 220, 222, 223, 226, 228, and 235; C.I. Reactive Violets 1, 2, 4, 5, 6, 22, 23, 33, 36, and 38; C.I. Reactive Blues 2, 3, 4, 7, 13, 14, 15, 19, 21, 25, 27, 28, 29, 38, 39, 41, 49, 50, 52, 63, 69, 71, 72, 77, 79, 89, 104, 109, 112, 113, 114, 116, 119, 120, 122, 137, 140, 143, 147, 160, 161, 162, 163, 168, 171, 176, 182, 184, 191, 194, 195, 198, 203, 204, 207, 209, 211, 214, 220, 221, 222, 231, 235, and 236; C.I. Reactive Greens 8, 12, 15, 19, and 21; C.I. Reactive Browns 2, 7, 9, 10, 11, 17, 18, 19, 21, 23, 31, 37, 43, and 46; and C.I. Reactive Blacks 5, 8, 13, 14, 31, 34, and 39. Such reactive dyes may be used individually or in combination.

Examples of the acid dye include C.I. Acid Yellows 1, 3, 6, 11, 17, 18, 19, 23, 25, 36, 38, 40, 40:1, 42, 44, 49, 59, 59:1, 61, 65, 67, 72, 73, 79, 99, 104, 159, 169, 176, 184, 193, 200, 204, 207, 215, 219, 219:1, 220, 230, 232, 235, 241, 242, and 246; C.I. Acid Yellow Oranges 3, 7, 8, 10, 19, 22, 24, 51, 51S, 56, 67, 74, 80, 86, 87, 88, 89, 94, 95, 107, 108, 116, 122, 127, 140, 142, 144, 149, 152, 156, 162, 166, and 168; C.I. Acid Reds 1, 6, 8, 9, 13, 18, 27, 35, 37, 52, 54, 57, 73, 82, 88, 97, 97:1, 106, 111, 114, 118, 119, 127, 131, 138, 143, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, 415, and 447; C.I. Acid Violets 17, 19, 21, 42, 43, 47, 48, 49, 54, 66, 78, 90, 97, 102, 109, and 126; C.I. Acid Blues 1, 7, 9, 15, 23, 25, 40, 61:1, 62, 72, 74, 80, 83, 90, 92, 103, 104, 112, 113, 114, 120, 127, 127:1, 128, 129, 138, 140, 142, 156, 158, 171, 182, 185, 193, 199, 201, 203, 204, 205, 207, 209, 220, 221, 224, 225, 229, 230, 239, 258, 260, 264, 277:1, 278, 279, 280, 284, 290, 296, 298, 300, 317, 324, 333, 335, 338, 342, and 350; C.I. Acid Greens 9, 12, 16, 19, 20, 25, 27, 28, 40, 43, 56, 73, 81, 84, 104, 108, and 109; C.I. Acid Browns 2, 4, 13, 14, 19, 28, 44, 123, 224, 226, 227, 248, 282, 283, 289, 294, 297, 298, 301, 355, 357, and 413; and C.I. Acid Blacks 1, 2, 3, 24, 24:1, 26, 31, 50, 52, 52:1, 58, 60, 63, 63S, 107, 109, 112, 119, 132, 140, 155, 172, 187, 188, 194, 207, and 222. Such acid dyes may be used individually or in combination.

Examples of the direct dye include C.I. Direct Yellows 8, 9, 10, 11, 12, 22, 27, 28, 39, 44, 50, 58, 86, 87, 98, 105, 106, 130, 137, 142, 147, and 153; C.I. Direct Oranges 6, 26, 27, 34, 39, 40, 46, 102, 105, 107, and 118; C.I. Direct Reds 2, 4, 9, 23, 24, 31, 54, 62, 69, 79, 80, 81, 83, 84, 89, 95, 212, 224, 225, 226, 227, 239, 242, 243, and 254; C.I. Direct Violets 9, 35, 51, 66, 94, and 95; C.I. Direct Blues 1, 15, 71, 76, 77, 78, 80, 86, 87, 90, 98, 106, 108, 160, 168, 189, 192, 193, 199, 200, 201, 202, 203, 218, 225, 229, 237, 244, 248, 251, 270, 273, 274, 290, and 291; C.I. Direct Greens 26, 28, 59, 80, and 85; C.I. Direct Browns 44, 44:1, 106, 115, 195, 209, 210, 212:1, 222, and 223; and C.I. Direct Blacks 17, 19, 22, 32, 51, 62, 108, 112, 113, 117, 118, 132, 146, 154, 159, and 169. Such direct dyes may be used individually or in combination.

In some embodiments, the water-soluble dye may be at least one acid dye selected from the group consisting of C.I. Acid Black 172, C.I. Acid Blue 90, C.I. Acid Blue 87, C.I. Acid Red 289, C.I. Acid Red 138, C.I. Acid Yellow 110, C.I. Acid Orange 95, C.I. Acid Orange 94, C.I. Acid Violet 97, C.I. Acid Black 52, C.I. Acid Black 52:1, and C.I. Acid Yellow 79.

While water-soluble dyes can produce favorably developed colors, the water-soluble dye in the known ink jet textile printing ink often produces foreign matter in the ink when the ink is stored for a long period. The ink jet textile printing ink of the present disclosure is prevented from causing the above-described problems in spite of containing a water-soluble dye. In other words, the ink jet textile printing ink, containing a water-soluble dye as cited above, is effective in solving the above-described issues.

Water

The ink jet textile printing ink of the present disclosure contains water. The water functions as a solvent of the water-soluble dye. Water imparts a favorable fluidity and viscosity to the ink jet textile printing ink, beneficial for favorable ejection of the ink jet textile printing ink by the ink jet method. Also, the water reduces effectively the impact on the cloth to which the ink jet textile printing ink is applied. In addition, water is favorable for avoiding VOC (volatile organic compound) issues.

The lower limit of the water content in the ink jet textile printing ink may be, but is not limited to, 40.0% by mass, 45.0% by mass, or 50.0% by mass. The upper limit of the water content in the ink jet textile printing ink may be, but is not limited to, 80.0% by mass, 75.0% by mass, or 70.0% by mass.

The ink jet textile printing ink having such a water content can be consistently ejected with a relatively high water-soluble dye content.

Water-Soluble Organic Solvent

The ink jet textile printing ink of the present disclosure contains a water-soluble organic solvent in addition to water.

The water-soluble organic solvent increases the moisture retention of the ink jet textile printing ink, preventing the ink effectively from drying and precipitating into solids in the ink jet head or the like. In addition, the water-soluble organic solvent is beneficial for adjusting the viscosity of the ink jet textile printing ink. Such an ink jet textile printing ink can be consistently ejected by an ink jet method.

The boiling point of the water-soluble organic solvent may be from 180° C. to 300° C. at 1 atmosphere.

Such a water-soluble organic solvent further increases the moisture retention of the ink jet textile printing ink, preventing the ink more effectively from drying and precipitating into solids in the ink jet head or the like. Such an ink jet textile printing ink can be consistently ejected by an ink jet method. In addition, the water-soluble organic solvent can be readily evaporated, if necessary, after ejecting the ink jet textile printing ink, thus being beneficial for reducing an undesired residue of the water-soluble organic solvent.

The water-soluble organic solvent may have at least one hydroxy group in the molecule thereof, and examples of such a water-soluble organic solvent include alkyl monoalcohols; alkyldiols; glycerin; triethanolamine; glycols, such as triethylene glycol and propylene glycol; glycol monoethers, such as triethylene glycol monobutyl ether. Such water-soluble organic solvents may be used individually or in combination.

In some embodiments, the water-soluble organic solvent may be selected from among glycerin, propylene glycol, triethylene glycol, triethylene glycol monobutyl ether, triethanolamine and may be propylene glycol, triethylene glycol, triethylene glycol monobutyl ether, or triethanolamine.

The use of such a water-soluble organic solvent favorably prevents the increase in viscosity of the ink jet textile printing ink while increasing the moisture retention of the ink jet textile printing ink, thus beneficial for consistent ejection of the ink.

The lower limit of the water-soluble organic solvent content in the ink jet textile printing ink may be, but is not limited to, 4.0% by mass, 9.0% by mass, or 11.0% by mass. The upper limit of the water-soluble organic solvent content in the ink jet textile printing ink may be, but is not limited to, 30.0% by mass, 25.0% by mass, or 20.0% by mass.

The water-soluble organic solvent with such content can impart a favorable viscosity to the ink jet textile printing ink and increase the moisture retention of the ink jet textile printing ink. Consequently, the ink jet textile printing ink can be more consistently ejected by an ink jet method.

In the ink jet textile printing ink, the water content XW (mass %) and the water-soluble organic solvent content XH (mass %) may have a specific ratio. The lower limit of XH/XW may be, but is not limited to, 0.020, 0.050, or 0.10. The upper limit of XH/XW may be, but is not limited to, 0.40, 0.35, or 0.30.

The water-soluble organic solvent with such content can impart a favorable viscosity to the ink jet textile printing ink and increase the moisture retention of the ink jet textile printing ink. Consequently, the ink jet textile printing ink can be more consistently ejected by an ink jet method.

Active Carbon Particles

The ink jet textile printing ink of the present disclosure contains active carbon particles, as described above.

The active carbon particles in the ink jet textile printing ink function as an adsorbent to adsorb foreign matter, such as the decomposition product of the water-soluble dye.

The active carbon particles under the following condition can satisfactorily adsorb foreign matter while ensuring an ejection consistency of the ink jet textile printing ink.

As described above, the ink jet textile printing ink of the present disclosure contains active carbon particles having a particle size of 50 nm to 1000 nm in the above-described specific proportion. In addition, the ink jet textile printing ink may contain the active carbon particles having a particle size of 50 nm to 200 nm in a proportion of 2000 to 30000 particles per milliliter.

The ejection consistency of the ink jet textile printing ink is thus increased. Also, even if the water-soluble dye decomposes during high-temperature storage or long-term storage, the active carbon particles adsorb foreign matter, such as the decomposition product of the water-soluble dye, effectively. The active carbon particles under the above condition provide an ink jet textile printing ink exhibiting both high storage stability and high ejection consistency.

The lower limit of the content of the active carbon particles having a particle size of 50 nm to 200 nm may be 2000 particles per milliliter as described above and, in some embodiments, may be 2500 or 3000 particles per milliliter. The upper limit of the content of the active carbon particles having a particle size of 50 nm to 200 nm may be 30000 particles per milliliter and, in some embodiments, may be 25000 or 20000 particles per milliliter. Such an ink is effective.

The lower limit of the average particle size of the active carbon particles may be 100 nm, 110 nm, or 120 nm. Also, the upper limit of the average particle size of the active carbon particles may be 600 nm, 550 nm, or 500 nm.

The ejection consistency of the ink jet textile printing ink is thus increased. Also, even if the water-soluble dye decomposes during high-temperature storage or long-term storage, the active carbon particles adsorb foreign matter, such as the decomposition product of the water-soluble dye, effectively. The active carbon particles under the above condition provide an ink jet textile printing ink exhibiting both high storage stability and high ejection consistency.

The term "average particle size" mentioned herein denotes a number average particle size unless otherwise specified. The average particle size may be determined by a measurement with a particle size distribution analyzer MT3300 EXII manufactured by MicrotracBEL.

Also, the upper limit of the average particle size of the active carbon particles may be 10000 nm, 9000 nm, or 8000 nm. The lower limit of the largest particle size of the active carbon particles in the ink jet textile printing ink may be 1500 nm, 2000 nm, or 2500 nm.

The ejection consistency of the ink jet textile printing ink is thus increased. Also, even if the water-soluble dye decomposes during high-temperature storage or long-term storage, the active carbon particles adsorb foreign matter, such as the decomposition product of the water-soluble dye, effectively. The active carbon particles under the above condition provide an ink jet textile printing ink exhibiting both high storage stability and high ejection consistency.

The largest particle size of the active carbon particles may be determined by a measurement with a particle size distribution analyzer MT3300 EXII manufactured by MicrotracBEL.

The upper limit of the number of active carbon particles having a particle size of 2000 nm or more contained in 1 mL of the ink jet textile printing ink may be 60000, 50000, or 40000. The lower limit of the number of active carbon particles having a particle size of 2000 nm or more contained in 1 mL of the ink jet textile printing ink may be 10, 50, or 100.

The ejection consistency of the ink jet textile printing ink is thus increased. Also, even if the water-soluble dye decomposes during high-temperature storage or long-term storage, the active carbon particles adsorb foreign matter, such as the decomposition product of the water-soluble dye, effectively. The active carbon particles under the above condition provide an ink jet textile printing ink exhibiting both high storage stability and high ejection consistency.

Urea Compound

The ink jet textile printing ink of the present disclosure may a urea compound.

The urea compound functions as a moisturizing agent of the ink jet textile printing ink or a dyeing aid to enhance the dye affinity of the water-soluble dye.

Examples of the urea compound include urea, ethyleneurea, tetramethylurea, thiourea, and 1,3-dimethyl-2-imidazolidinone.

The lower limit of the urea compound content in the ink jet textile printing ink may be 0.50% by mass, 1.0% by mass, or 1.5% by mass. The upper limit of the urea compound content in the ink jet textile printing ink may be 10.0% by mass, 8.0% by mass, or 6.0% by mass.

When the urea compound content is in such a range, the water-soluble dye content is not much reduced, and accordingly, the water-soluble dye can sufficiently produce the intended effect, while the urea compound can function as intended.

Optional Constituents

The ink jet textile printing ink of the present disclosure may optionally contain other constituents. Such constituents may be hereinafter referred to as "optional constituents".

Examples of such constituents include a coloring agent, such as a pigment or a dye other than the water-soluble dye; a pH adjuster; a chelating agent, such as an ethylenediaminetetraacetic acid salt (EDTA salt); a preservative or fungicide, such as sodium benzoate, sodium pentachlorophenol, sodium 2-pyridinethiol-1-oxide, sodium sorbate, sodium dehydroacetate, 1,2-dibenzothiazoline-3-one, or 4-chloro-3-methylphenol; a rust preventive, such as benzotriazole; a flame retardant; a dispersant, a surfactant, an antioxidant, a UV absorber; an oxygen absorber; a solubilizing agent; and a penetration agent.

The preservative or fungicide may be a compound having an isothiazoline ring structure in the molecule thereof.

The surfactant may be an anionic surfactant, a cationic surfactant, or a nonionic surfactant.

The total content of such optional constituents may be 6.0% by mass or less or 5.0% by mass or less. The lower limit of the total content of the optional constituents is 0% by mass.

The lower limit of the surface tension at 25° C. of the ink jet textile printing ink may be 20 mN/m, 21 mN/m, or 23 mN/m. Also, the upper limit of the surface tension at 25° C. of the ink jet textile printing ink may be 50 mN/m, 40 mN/m, or 30 mN/m.

Such an ink jet textile printing ink is unlikely to clog the nozzles of the ink jet head and exhibits a satisfactory ejection consistency. Even if nozzles are clogged, the nozzles can be easily recovered from the clog by putting a cap over the nozzles.

The surface tension may be measured by the Wilhelmy method. In this instance, a surface tensiometer, such as CBVP-7 manufactured by Kyowa Interface Science, may be used.

The lower limit of the viscosity at 25° C. of the ink jet textile printing ink of the present disclosure may be 2 mPa·s, 3 mPa·s, or 4 mPa·s. Also, the upper limit of the viscosity at 25° C. of the ink jet textile printing ink may be 10 mPa·s, 8 mPa·s, or 6 mPa·s.

Such an ink jet textile printing ink can be consistently ejected by an ink jet method.

The viscosity may be measured in accordance with JIS Z8809 using a vibration viscometer.

The ink jet textile printing ink of the present disclosure is ejected by an ink jet method, and the ink jet method may be a continuous method, such as a charge deflection method, or an on-demand method, such as a piezoelectric method or a bubble jet (registered trademark) method. In some embodiments of the present disclosure, the ink jet textile printing ink may be ejected from an ink jet head using piezoelectric oscillators.

The water-soluble dye in the ink jet textile printing ink is thus prevented from deteriorating in the ink jet head, and the ink jet textile printing ink is consistently ejected.

The ink jet textile printing ink of the present disclosure may be ejected from an ink jet head having a pressure chamber and a circulation path enabling the ink jet textile printing ink in the pressure chamber to be circulated.

The circulation enables the composition of the ink jet textile printing ink to be uniform. In addition, the circulation enables ink jet textile printing inks having different viscosities in a wide range to be favorably ejected even if the viscosity of the ink is relatively high. The ink jet textile printing ink is thus consistently ejected by an ink jet method.

The circulation may be performed under, but not limited to, the following conditions.

The lower limit of the ratio of the circulation flow rate of the ink jet textile printing ink to the maximum ejection rate of the ink jet head may be 0.05, 0.07, or 0.10. Also, the upper limit of the ratio of the circulation flow rate of the ink jet textile printing ink to the maximum ejection rate of the ink jet head may be 20, 15, or 10.

Such circulation prevents the ink effectively from drying around the nozzles, thus preventing the ink more effectively from precipitating into solids. Thus, the circulation ensures an ejection consistency of the ink jet textile printing ink ejected by an ink jet method.

An ink jet apparatus including an ink jet head from which the ink jet textile printing ink of the present disclosure is ejected will be described later herein.

Ink Jet Textile Printing Ink Set

An ink jet textile printing ink set according to the present disclosure will now be described.

The ink jet textile printing ink set includes a plurality of ink jet textile printing inks. At least one of the ink jet textile printing inks is the above-described ink according to the present disclosure.

Hence, the ink set includes an ink jet textile printing ink that is stable in storage and consistent in ejection.

Since at least one of the ink jet textile printing inks of the ink set is the ink according to the present disclosure, the ink set may include other ink jet textile printing inks outside the scope of the present disclosure. In some embodiments, however, two or more, or three or more, inks may be the ink jet textile printing inks according to the present disclosure.

Beneficially, three primary color inks, namely cyan, magenta, and yellow inks, are ink jet textile printing inks according to the present disclosure. Each of the three primary colors has variations according to the color density. For example, the ink set may include a light cyan ink, a light magenta ink, and a light yellow ink in addition to the cyan, magenta, and yellow inks.

In addition to such chromatic color inks, the ink jet textile printing ink set may include an achromatic color ink, such as a black ink. In this instance, the achromatic color ink may be an ink jet textile printing ink according to the present disclosure.

Ink Jet Textile Printing Method

An ink jet textile printing method according to the present disclosure will now be described.

The ink jet textile printing method includes an ejection step of applying the ink jet textile printing ink disclosure herein onto a cloth by an ink jet method, and a dyeing step of dyeing the cloth with the ink jet textile printing ink.

The ink jet textile printing method enables the ink jet textile printing ink to be favorably ejected in a desired pattern, thus producing a favorably dyed product including a dyed portion formed in the desired pattern with a high dye affinity to the cloth.

Ejection Step

In the ejection step, droplets of the ink jet textile printing ink of the present disclosure are ejected by an ink jet method to apply the droplets onto a cloth as a printing medium, thus forming a desired image. For forming an image, a plurality of ink jet textile printing inks, for example, including one or more ink jet textile printing inks according to the present disclosure, may be used.

Any ink jet method may be used to eject the ink jet textile printing ink. For example, the ink may be ejected by a continuous method, such as a charge deflection method, or an on-demand method, such as a piezoelectric method or a bubble jet (registered trademark) method.

The ink jet apparatus used for ejecting the ink jet textile printing ink will be described later herein.

Dyeing Step

In the dyeing step, the water-soluble dye applied onto the printing medium is fixed. The dyeing step is performed under high-temperature and high-humidity conditions.

The lower limit of the dyeing temperature in the dyeing step may be, but is not limited to, 90° C., 95° C., or 98° C. The upper limit of the dyeing temperature in the dyeing step may be, but is not limited to, 150° C., 130° C., or 120° C.

Thus, the cloth and the constituents of the ink jet textile printing ink are prevented from being degraded, and the water-soluble dye is efficiently fixed.

The lower limit of the operation period for the dyeing step may be, but is not limited to, 1 minute, 2 minutes, or 3 minutes. The upper limit of the operation period for the dyeing step may be, but is not limited to, 120 minutes, 90 minutes, or 60 minutes.

Thus, the water-soluble dye exhibits satisfactory dye affinity to the cloth, and the productivity of the dyed product is increased.

For a high-temperature, high-humidity operation in the dyeing step, a steamer, for example, Steamer DHe manufactured by Mathis, may be used.

The ink jet textile printing method of the present disclosure may further include optional steps in addition to the ejection step and the dyeing step.

For example, the cloth, or printing medium, may be pretreated in a pretreatment step before the ejection step.

In the pretreatment step, a known pretreatment agent may be used. The pretreatment gent typically contains a sizing agent, a pH adjuster, and a hydrotropic agent.

Examples of the sizing agent include natural gums, such as guar and locust bean; starches; sodium alginate; seaweed, such as funori; pectic acid extracted from epidermis; cellulose derivatives, such as methyl cellulose, ethyl cellulose, hydroxyethyl cellulose, and carboxymethyl cellulose; processed starches, such as roasted starch, alpha starch, carboxymethyl starch, carboxyethyl starch, and hydroxyethyl starch; processed natural gums, such as shiraz-based gums and roasted bean gum-based gums; alginic acid derivatives; and synthetic gums or emulsions, such as polyvinyl alcohol and polyacrylic esters.

Examples of the pH adjuster include ammonium salts, such as ammonium sulfate and ammonium tartrate.

Examples of the hydrotropic agent include urea and urea compounds, such as dimethylurea, thiourea, monomethylthiourea, dimethylthiourea, and other alkylureas. The pretreatment agent may further contain silica.

After the dyeing step, the dyed cloth may be washed in a washing step.

In the washing step, the dyed cloth may be sufficiently washed with water and then immersed with stirring in a cleaning liquid prepared by adding a nonionic soaping agent to warm water of 40° C. to 70° C. The immersion in the cleaning liquid may be continued for a period of 5 minutes to 60 minutes. Then, the soaping agent is removed by washing the cloth while adding running water to the cleaning liquid.

Cloth

The cloth used as the printing medium onto which the ink jet textile printing ink is applied will now be described.

Examples of the cloth include woven textile, such as plain-woven fabrics, twill weave fabrics, sateen weave fabrics, irregular plain-woven fabric, irregular twill weave fabrics, irregular sateen weave fabrics, exceptional woven fabrics, figured fabrics, double-faced fabrics, double cloths, multi-layered woven fabrics, warp-pile fabrics, weft-pile fabrics, and leno weave fabrics.

The thickness of the fiber filaments of the cloth may be in the range of 10 D to 100 D.

The material of the fiber filaments of the cloth may be polyester, nylon, triacetate, diacetate, polyamide, cellulose, or a combination of such materials. In an embodiment, the cloth may be made of a combination of such a material and a regenerated fiber, such as rayon, or a natural fiber, such as cotton, silk, or wool.

Ink Jet Apparatus

An ink jet apparatus according to the present disclosure will now be described.

The ink jet apparatus includes an ink jet head from which the ink jet textile printing ink of the present disclosure is ejected.

The ink jet head enables consistent ejection of the ink jet textile printing ink, thus enabling the ink jet apparatus to produce a product dyed with a water-soluble dye having a high dye affinity to the cloth.

The ink jet head may include a piezoelectric oscillator. Such an ink jet head prevents the water-soluble dye effectively from deteriorating in the ink jet head and enables favorable ejection consistency in an ink jet method.

The ink jet head may include a circulation path enabling the ink jet textile printing ink in the pressure chamber to be circulated.

Such an ink jet head further enhances the ejection consistency in an ink jet method.

The lower limit of the ratio of the circulation flow rate of the ink jet textile printing ink to the maximum ejection rate of the ink jet head may be 0.05, 0.07, or 0.10. Also, the upper limit of the ratio of the circulation flow rate of the ink jet textile printing ink to the maximum ejection rate of the ink jet head may be 20, 15, or 10.

Such an ink jet head ensures an ejection consistency in the ink jet method.

A first and a second embodiment of the ink jet apparatus according to the present disclosure will now be described in detail with reference to the drawings.

First Embodiment

Figure 2:
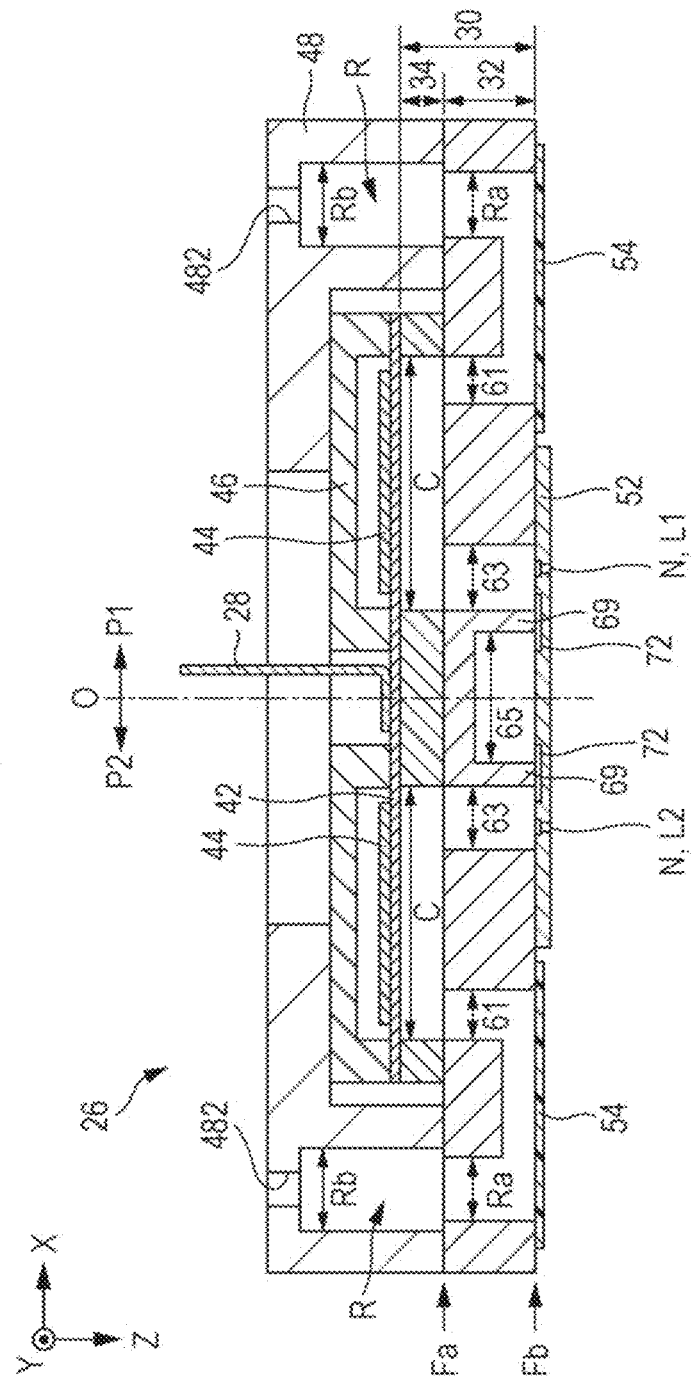
FIG. 2 is a sectional view of an ink jet head of the ink jet apparatus shown in FIG. 1.
Figure 3:
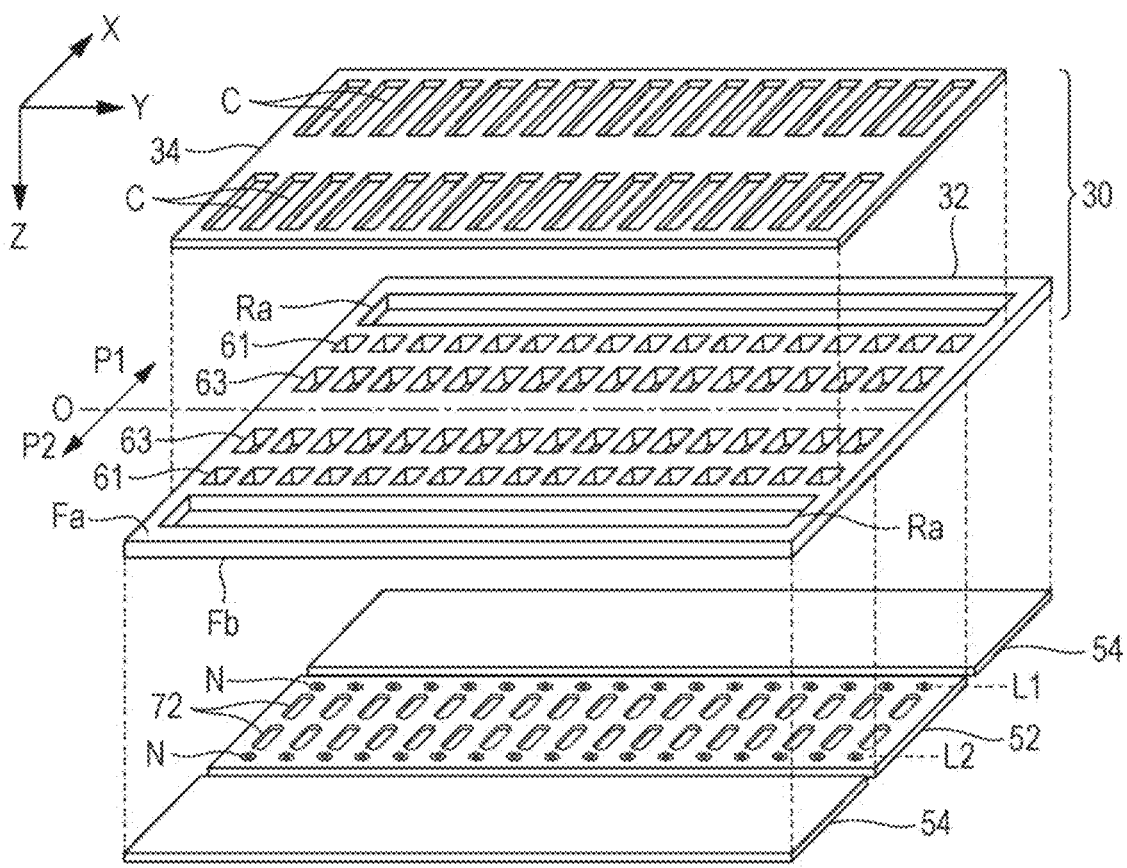
FIG. 3 is a fragmentary exploded perspective view of the ink jet head shown in FIG. 2.
Figure 4:
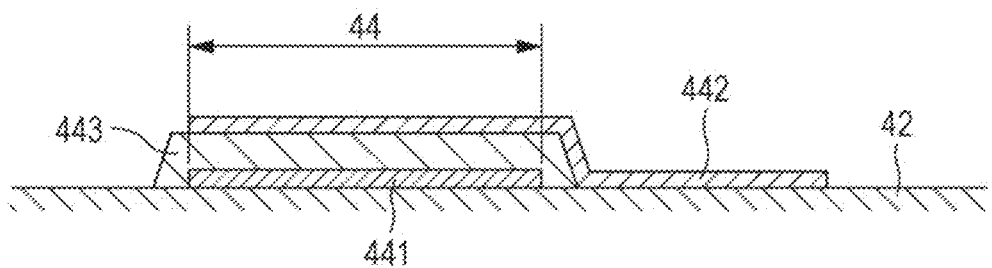
FIG. 4 is a sectional view of a piezoelectric element used in the ink jet head shown in FIG. 2.
Figure 5:
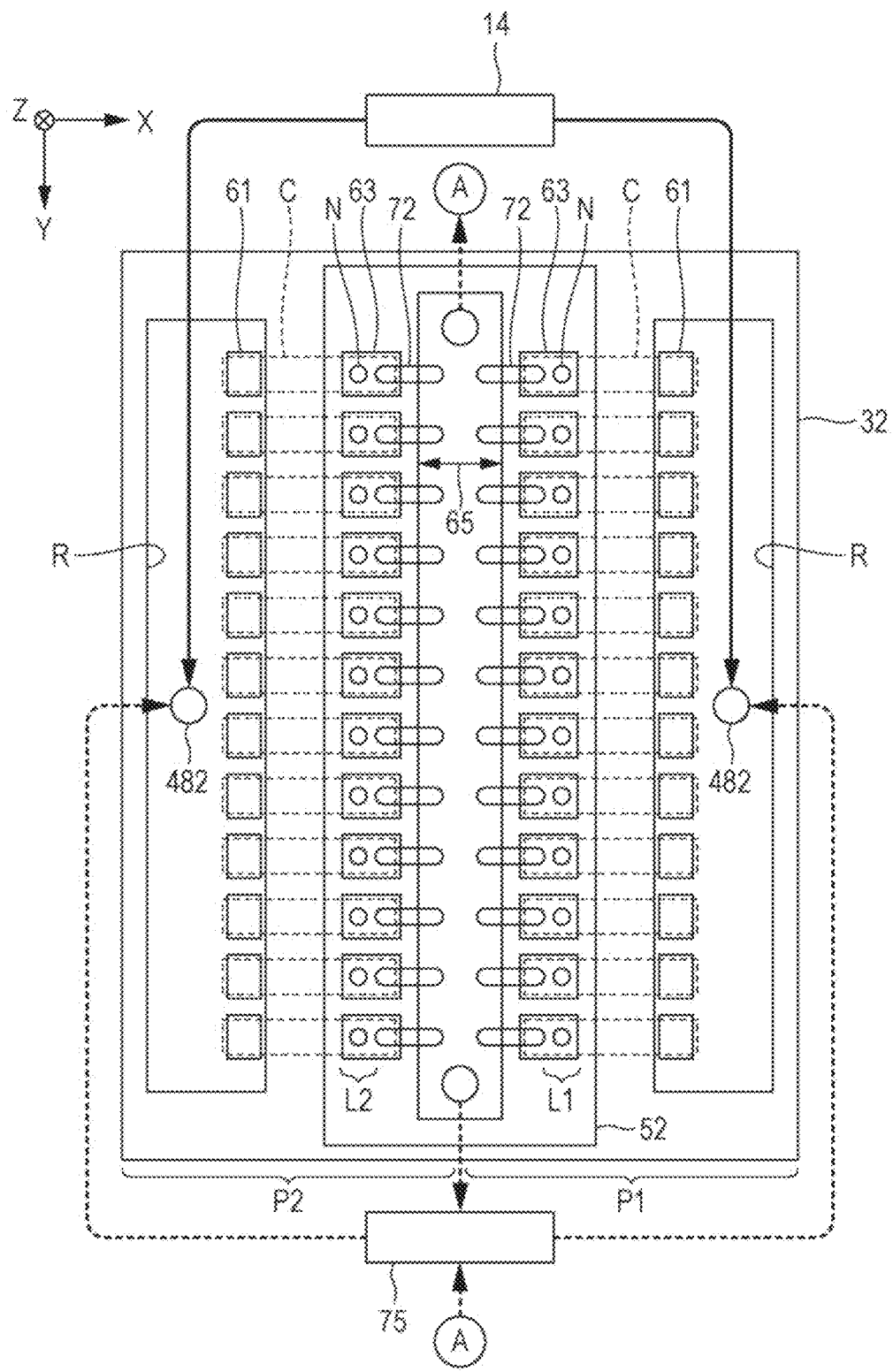
FIG. 5 is an illustrative representation of the circulation of an ink in the ink jet head shown in FIG. 2.
Figure 6:
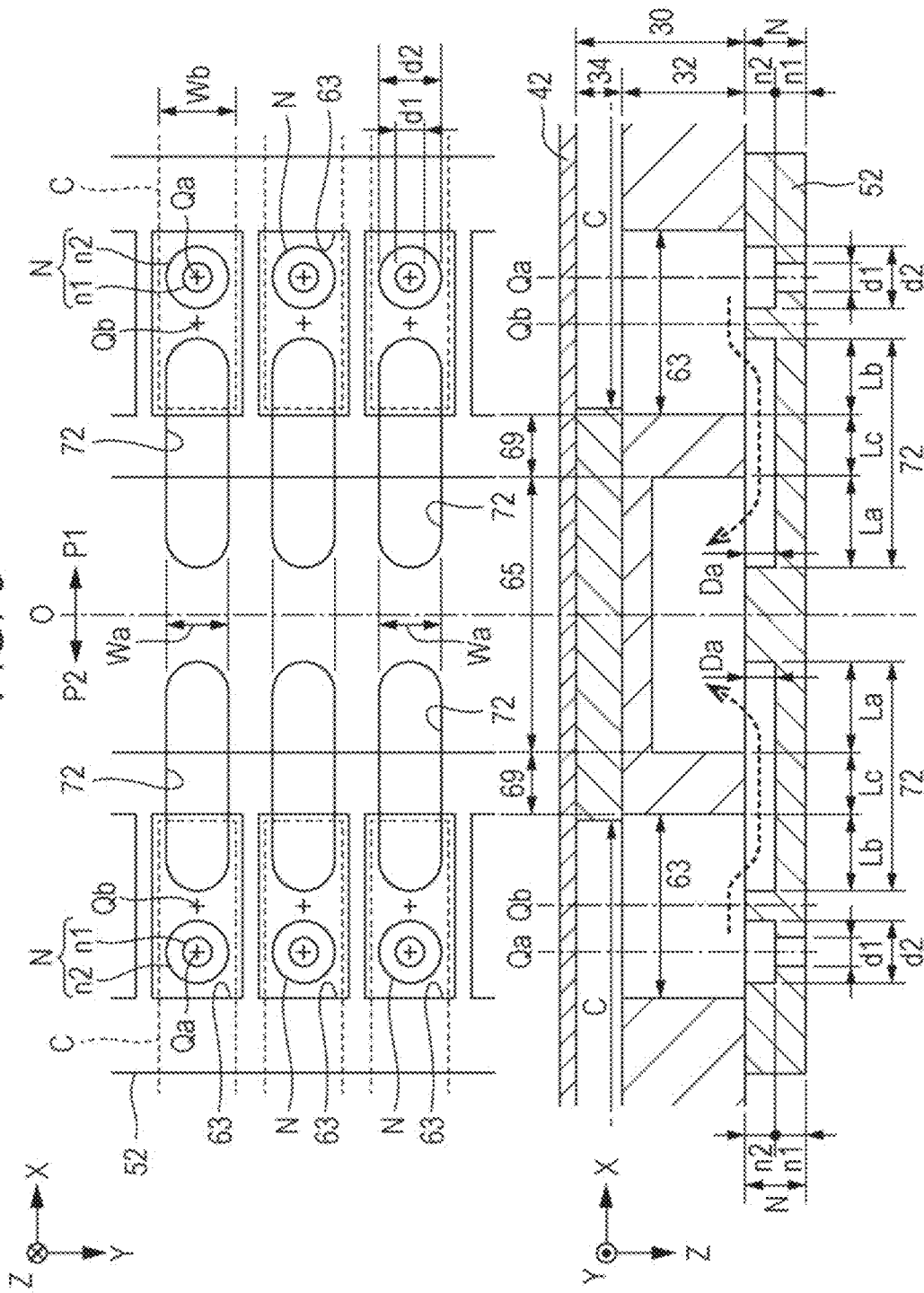
FIG. 6 is an illustrative representation including a plan view and a sectional view of an ink circulation chamber and the vicinity thereof of the ink jet head shown in FIG. 2.

FIG. 1 is a configuration diagram of an ink jet apparatus according to a first embodiment of the present disclosure. FIG. 2 is a sectional view of the ink jet head of the ink jet apparatus shown in FIG. 1. FIG. 3 is a fragmentary exploded perspective view of the ink jet head shown in FIG. 2. FIG. 4 is a sectional view of a piezoelectric element used in the ink jet head shown in FIG. 2. FIG. 5 is an illustrative representation of the circulation of an ink in the ink jet head shown in FIG. 2. FIG. 6 is an illustrative representation including a plan view and a sectional view of an ink circulation chamber and the vicinity thereof of the ink jet head shown in FIG. 2.

The ink jet apparatus 100 of the present disclosure is an ink jet printing apparatus configured to eject one or more inks onto a cloth 12. The ink jet apparatus 100 includes an ink container 14 adapted to store the ink. For example, the ink container 14 of the ink jet apparatus 100 may be a removable cartridge, an ink bag made of a flexible film, or an ink tank capable of being refilled with the ink. The ink jet apparatus 100 may include a plurality of ink containers 14 for a plurality of inks.

The ink jet apparatus 100 also includes a control unit 20, a transport mechanism 22, a transfer mechanism 24, and an ink jet head 26. The control unit 20 may include a processing circuit, such as a CPU (central processing unit) or an FPGA (field programmable gate array), and a memory circuit, such as a semiconductor memory device, and centrally controls the components or members of the ink jet apparatus 100. The transport mechanism 22 transports the cloth 12 in the Y direction under the control of the control unit 20.

The transfer mechanism 24 reciprocally moves the ink jet head 26 in the X direction under the control of the control unit 20. The X direction is perpendicular to the Y direction in which the cloth 12 is transported. The transfer mechanism 24 includes a transfer box 242 adapted to accommodate the ink jet head 26 and a transfer belt 244 to which the transfer box 242 is secured. In an embodiment, a plurality of ink jet heads 26 may be accommodated in the transfer box 242, or the ink container 14 may also be accommodated in the transfer box 242 together with the ink jet head 26.

The ink jet head 26 ejects the ink fed from the ink container 14 onto the cloth 12 through a plurality of nozzles N under the control of the control unit 20. The ink jet head 26 ejects the ink onto the cloth 12 along with the transport of the cloth 12 by the transport mechanism 22 and the reciprocal movement of the transfer box 242, thus forming a desired image on the surface of the cloth 12. A direction perpendicular to the X-Y plane is hereinafter referred to as the Z direction. The direction in which the ink is ejected from the ink jet head 26, typically, a vertical direction, is the Z direction.

The plurality of nozzles N of the ink jet head 26 are aligned in the Y direction. The arrangement of the nozzles N includes a first line L1 and a second line L2 that are arranged in the X direction at an interval therebetween. The first line L1 and the second line L2 are each a group of nozzles N linearly aligned in the Y direction. In an embodiment, the nozzles N of either the first line L1 or the second line L2 may be displaced in the Y direction with respect to the other line, for example, in a staggered manner or a staggered arrangement. The following description, however, illustrates an arrangement in which the nozzles N of the first line L1 and the second line L2 are coincident in position in the Y direction between the two lines. In the following description, the plane that passes through the central axis parallel to the Y direction of the ink jet head 26 and that is parallel to the Z direction, that is, the Y-Z plane of the ink jet head 26, is referred to as the "central plane O".

As shown in FIGS. 2 and 3, the ink jet head 26 has nozzles N including first nozzles in the first line L1 and second nozzles in the second line L2, and the components for the first nozzles and the components for the second nozzles are symmetrically arranged with respect to the central plane O. The portion of the ink jet head 26 on the positive side of the central plane O in the X-direction is a first portion P1, and the portion on the negative side in the X direction is a second portion P2. The two portions have substantially the same structure. The nozzles N in the first line L1 are formed in the first portion P1, and the nozzles N in the second line L2 are formed in the second portion P2. The central plane O is the boundary between the first portion P1 and the second portion P2.

As shown in FIGS. 2 and 3, the ink jet head 26 has a flow path portion 30. The flow path portion 30 is a structure in which flow paths through which an ink is fed to the plurality of nozzles N are formed. The flow path portion 30 includes a first flow path substrate 32 acting as a communication plate and a second flow path substrate 34 acting as a pressure chamber plate. The two plates are disposed one on the other. The first flow path substrate 32 and the second flow path substrate 34 are each a plate member that is long in the Y direction. The second flow path substrate 34 is disposed with, for example, an adhesive on the surface Fa of the first flow path substrate 32 on the negative side in the Z direction.

As shown in FIG. 2, the first flow path substrate 32 is provided, at the surface Fa thereof, with a vibration member 42, a plurality of piezoelectric elements 44, a protection member 46, and a housing 48, in addition to the second flow path substrate 34. On the positive side in the Z direction of the first flow path substrate 32, that is, on the surface Fb opposite the surface Fa, a nozzle plate 52 and an absorber 54 are disposed. The members of the ink jet head 26 are generally long in the Y direction as well as the first flow path substrate 32 and the second flow path substrate 34 and are bonded together with, for example, an adhesive. The Z direction may be considered to be the direction in which the first flow path substrate 32 and the second flow path substrate 34 are stacked one on the other or the direction in which the first flow path substrate 32 and the nozzle plate 52 are stacked one on the other.

The nozzle plate 52 is a plate member having a plurality of nozzles N therein and may be disposed on the surface Fb of the first flow path substrate 32 with, for example, an adhesive. Each of the nozzles N is a circular through-hole through which the ink passes. The nozzle plate 52 has nozzles N defining the first line L1 and nozzles N defining the second line L2. More specifically, the nozzles N in the first line L1 are aligned in the Y direction on the positive side in the X direction of the nozzle plate 52 with respect to the central plane O, and the nozzles N in the second line L2 are aligned in the Y direction on the negative side in the X direction of the nozzle plate 52. The nozzle plate 52 is a continuous one-piece plate member having both the nozzles N in the first line L1 and the nozzles N in the second line L2.

As shown in FIGS. 2 and 3, the first flow path substrate 32 has a space Ra, a plurality of feed paths 61, and a plurality of communication paths 63 in both the first portion P1 and the second portion P2. The space Ra is an opening having a rectangular shape long in the Y direction when viewed from above or in the Z direction, and the feed paths 61 and the communication paths 63 are through-holes formed individually for the nozzles N. The communication paths 63 are aligned in the Y direction when viewed from above, and the feed paths 61 are aligned in the Y direction between the alignment of the communication paths 63 and the space Ra. The feed paths 61 communicate with and share the space Ra. Any one of the communication paths 63 is coincident in position with the corresponding nozzle N when viewed from above. More specifically, any one of the communication paths 63 in the first portion P1 communicates with the corresponding nozzle N in the first line L1. Similarly, any one of the communication paths 63 in the second portion P2 communicates with the corresponding nozzle N in the second line L2.

As shown in FIGS. 2 and 3, the second flow path substrate 34 is a plate member having a plurality of pressure chambers C in each of the first portion P1 and the second portion P2. The pressure chambers C in each portion are aligned in the Y direction. The pressure chambers C are provided one for each nozzle N and are each a space long in the X direction when viewed from.

As shown in FIG. 2, the second flow path substrate is provided with a vibration member 42 on the surface thereof opposite the first flow path substrate 32. The vibration member 42 is an elastic plate capable of vibrating, that is, a vibration plate. In an embodiment, the second flow path substrate 34 and the vibration member 42 may be formed in a one-piece body whose thickness is selectively reduced corresponding to the positions of the pressure chambers C.

The surface Fa of the first flow path substrate 32 and the vibration member 42 oppose each other with the spaces of the pressure chambers C therebetween, as shown in FIG. 2. The Pressure chambers C, which are spaces formed between the surface Fa of the first flow path substrate 32 and the vibration member 42, vary the pressure applied to the ink in the spaces. The pressure chambers C are each a space long in the X direction and are formed individually, one for each nozzle N. The pressure chambers C are arranged in the Y direction in each of the first portion P1 and the second portion P2. As shown in FIGS. 2 and 3, one end adjacent to the central plane O of any one of the pressure chambers C is aligned with the corresponding communication path 63 when viewed from above, and the other end, opposite the central plane O, is aligned with the corresponding feed path 61 when viewed from above. Thus, the pressure chambers C communicate with the nozzles N through the communication paths 63 and communicate with the space Ra through the feed paths 61 in each of the first portion P1 and the second portion P2.

A plurality of piezoelectric elements 44 are provided on the surface of the vibration member 42 opposite the pressure chambers individually for the nozzles N in each of the first portion P1 and the second portion P2, as shown in FIG. 2. The piezoelectric elements 44 are passive elements that deform with driving signals applied thereto. The piezoelectric elements 44 are arranged in the Y direction, corresponding to the pressure chambers C. Any one of the piezoelectric elements 44 is a multilayer composite including a first electrode 441 and a second electrode 442 with a piezoelectric layer 443 therebetween, as shown in FIG. 4. One of the first electrode 441 and the second electrode 442 may be a continuous electrode across the plurality of piezoelectric elements 44, that is, a common electrode shared by the piezoelectric elements 44. The portions in which the first electrode 411, the second electrode 442, and the piezoelectric layer 443 lie on each other act as the piezoelectric elements 44. Alternatively, the portions that deform with driving signals applied thereto, that is, active portions that vibrate the vibration member 42, may define piezoelectric elements 44. Thus, the ink jet head 26 of the present embodiment includes first piezoelectric elements and second piezoelectric elements. For example, the first piezoelectric elements 44 are arranged on one side in the X direction with respect to the central plane O, and the second piezoelectric elements 44 are arranged on the other side with respect to the central plane O. When the vibration member 42 vibrates in conjunction with the deformation of the piezoelectric elements 44, the pressure in the pressure chambers C varies, and thus, the ink in the pressure chambers C is ejected through the communication paths 63 and the nozzles N.

The protection member 46 is a plate member configured to protect the plurality of piezoelectric elements 44 and is disposed on the surface of the vibration member 42. The piezoelectric elements 44 are accommodated individually in the recesses formed in the surface, adjacent to the vibration member 42, of the protection member 46.

A terminal of a wiring board 28 is coupled to the surface, opposite the flow path portion 30, of the vibration member 42. The wiring board 28 is a flexible component having a plurality of conducting wires (not shown) that electrically couple the control unit 20 to the ink jet head 26. A terminal of the wiring board 28 is extracted through an opening of the protection member 46 and an opening of the housing 48 and coupled to the control unit 20. The wiring board 28 may be, for example, an FPC (flexible printed circuit) or an FFC (flexible flat cable).

The housing 48 is a case adapted to hold the ink to be fed to the pressure chambers C. The surface of the housing 48 on the positive side in the Z direction is bonded to the surface Fa of the first flow path substrate 32 with, for example, an adhesive.

As shown in FIG. 2, the housing 48 has a space Rb in each of the first portion P1 and the second portion P2. The space Rb of the housing 48 and the space Ra of the first flow path substrate 32 communicate with each other. The space Ra and the space Rb define a space that acts as an ink reservoir R from which the ink is fed to the pressure chambers C. The ink reservoir R is a common ink chamber shared with the plurality of nozzles N. Each of the first portion P1 and the second portion P2 has the ink reservoir R. The ink reservoir R in the first portion P1 is located on the positive side in the X-direction with respect to the central plane O, and the ink reservoir R in the second portion P2 is located on the negative side in the X direction with respect to the central plane O. The housing 48 has inlets 482 in the surface thereof opposite the first flow path substrate 32. The ink fed from the ink container is introduced into the ink reservoirs R through the respective inlets 482.

As shown in FIG. 2, a vibration absorber 54 is disposed on the surface Fb of the first flow path substrate 32 in each of the first portion P1 and the second portion P2. The vibration absorber 54 is a flexible film that absorbs pressure changes on the ink in the ink reservoir R. The vibration absorber 54 is disposed on the surface Fb of the first flow path substrate 32 to close the space Ra and feed paths 61 of the first flow path substrate 32, as shown in FIG. 3, thus defining a wall of the ink reservoir R.

As shown in FIG. 2, the first flow path substrate has an ink circulation chamber 65 in the surface Fb thereof opposing the nozzle plate 52. The ink circulation chamber 65 is an opening with a bottom that is long in the Y direction when viewed from above. The open end of the ink circulation chamber 65 is closed by the nozzle plate 52 joined to the surface Fb of the first flow path substrate 32.

As shown in FIG. 5, the ink circulation chamber 65 extends along the first line L1 and the second line L2 of the nozzles N. More specifically, the ink circulation chamber 65 is formed between the alignment of the nozzles N in the first line L1 and the alignment of the nozzles N in the second line L2. Thus, the ink circulation chamber 65 lies between the communication paths 63 in the first portion P1 and the communication paths 63 in the second portion P2, as shown in FIG. 2. Thus, the flow path portion 30 of the present embodiment is a multilayer composite having first pressure chambers that are the pressure chambers C in the first portion P1, first communication paths that are the communication paths 63 in the first portion P1, second pressure chambers that are the pressure chambers C in the second portion P2, second communication paths that are the communication paths 63 in the second portion P2, and the ink circulation chamber 65 between the arrangement of the communication paths 63 in the first portion P1 and the arrangement of the communication paths 63 in the second portion P2. The flow path portion 30 of the first embodiment has a partition 69 to separate the ink circulation chamber 65 from the communication paths 63, as shown in FIG. 2.

In each of the first portion P1 and the second portion P2, the piezoelectric elements 44, as well as the pressure chambers C, are aligned or arranged in the Y direction. Thus, the ink circulation chamber 65 extends continuously in the Y direction across the region of the pressure chambers C or the piezoelectric elements 44 in each of the first portion P1 and the second portion P2. In other words, the ink circulation chamber 65 and the ink reservoirs R extend in the Y direction with intervals therebetween, and the pressure chambers C, the communication paths 63, and the nozzles N are located in the interval, as shown in FIGS. 2 and 3.

As shown in FIG. 6, the nozzles N individually have a first section n1 and a second section n2. The first section n1 and the second section n2 are coaxial circular spaces communicating with each other. The second section n2 is closer than the first section n1 to the flow path portion 30. The inner diameter d2 of the second section n2 is larger than the inner diameter d1 of the first section n1. Such nozzles N in a step form are advantageous for controlling the flow resistance in each nozzle N as desired. The central axis Qa of each nozzle N is opposite to the ink circulation chamber 65 with respect to the central axis Qb of the communication path 63, as shown in FIG. 6.

As shown in FIG. 6, the nozzle plate 52 is provided in each of the first portion P1 and the second portion P2 with a plurality of circulation paths 72 in the surface thereof opposing the flow path portion 30. The circulation paths 72 in the first portion P1 are first circulation paths and correspond one-to-one to the nozzles N in the first line L1. The circulation paths 72 in the second portion P2 are second circulation paths and correspond one-to-one to the nozzles N in the second line L2.

Each circulation path 72 is an opening with a bottom that is long in the X direction, functioning as a path through which the ink flows. The circulation path 72 has a distance from the corresponding nozzle N and is closer than this nozzle N to the ink circulation chamber 65.

The circulation path 72 is linear and has a width Wa equal to the inner diameter d2 of the second section n2 of the nozzle N, as shown in FIG. 6. The width Wa of the circulation path 72, which is the measurement in the Y direction of the circulation path 72, is smaller than the width Wb of the pressure chamber C that is the measurement in the Y direction of the pressure chamber C. This structure increases the flow resistance in the circulation path 72 compared to the structure in which the width Wa of the circulation path 72 is larger than the width Wb of the pressure chamber C. The depth Da of the circulation path 72 from the surface of the nozzle plate 52 is constant throughout the length of the circulation path. More specifically, the circulation path 72 has a constant depth that is equal to the depth of the second section n2 of the nozzle N. Such a structure is easy to form compared to the structure in which the circulation path 72 and the second section n2 have different depths. The "depth" of a path refers to the measurement in the Z direction of the path.

Any one of the circulation paths 72 in the first portion P1 lies closer than the corresponding nozzle N to the ink circulation chamber 65. Also, any one of the circulation paths 72 in the second portion P2 lies closer than the corresponding nozzle N to the ink circulation chamber 65. The end, opposite the central plane O (or adjacent to the communication path 63), of the circulation path 72 lies within the corresponding communication path 63 when viewed from above. Hence, the circulation path 72 communicates with the communication path 63. On the other side, the end adjacent to the central plane O (or at the ink circulation chamber 65) of the circulation path 72 lies within the ink circulation chamber 65 when viewed from above. Hence, the circulation path 72 communicates with the ink circulation chamber 65. As described above, each of the communication paths 63 communicates with the ink circulation chamber 65 through the circulation path 72. Thus, the ink in each communication path 63 is fed to the ink circulation chamber 65 through the circulation path 72, as indicated by the broken lines with an arrowhead in FIG. 6. In other words, the communication paths 63 corresponding to the nozzles N in the first line L1 and the communication paths corresponding to the nozzles N in the second line L2 share and communicate with the single ink circulation chamber 65.

In FIG. 6, any one of the circulation path 72 has a portion with a length La overlapping with the ink circulation chamber 65, a portion with a length Lb overlapping with the communication path 63, and a portion with a length Lc overlapping with the partition 69 of the flow path portion 30. Length Lc is equivalent to the thickness of the partition 69. The partition 69 acts as a stop of the circulation path 72. Accordingly, the longer the length Lc or the thickness of the partition 69, the larger the flow resistance in the circulation path 72. In the present embodiment, length La is larger than length Lb and length Lc. In addition, length Lb is larger than length Lc. In such a structure, the ink can be easily introduced into the ink circulation chamber 65 from the communication path 63 through the circulation path 72 compared to the structure in which length La and length Lb are shorter than length Lc.

In the present embodiment, the pressure chamber C communicates with the ink circulation chamber 65 through the communication path 63 and the circulation path 72, as described above. Hence, the pressure chamber C does not communicate directly with the ink circulation chamber 65.

In such a structure, as the piezoelectric element 44 operates to change the pressure in the pressure chamber C, part of the ink flowing in the communication path 63 is ejected through the nozzle N, and part of the rest of the ink flows into the ink circulation chamber 65 from the communication path 63 through the circulation path 72. In the present embodiment, the inertances in the communication path 63, the nozzle N, and the circulation path 72 are determined so that the amount (ejection amount) of the ink ejected from the communication path 63 through the nozzle N by one operation of the piezoelectric element 44 is larger than the amount (circulation amount) of the ink flowing into the ink circulation chamber 65 from the communication path 63 through the circulation path 72. In other words, if all the piezoelectric elements 44 are operated at one time, the total circulation amount of the ink flowing into the ink circulation chamber 65 from the plural communication paths is larger than the total ejection amount of the ink ejected through the plural nozzles N.

More specifically, the flow resistance in each of the communication path 63, the nozzle N, and the circulation path 72 is determined so that the circulation amount can account for 70% or more (or the ejection amount can account for 30% or less) of the ink flowing in the communication path 63. Thus, the ink in the vicinity of the nozzles is circulated effectively through the ink circulation chamber with a sufficient ejection amount ensured. Broadly speaking, as the flow resistance in the circulation path 72 is increased, the circulation amount decreases, whereas the ejection amount increases; and as the flow resistance in the circulation path 72 is reduced, the circulation amount increases, whereas the ejection amount decreases.

The ink jet apparatus 100 includes a circulation mechanism 75 as shown in FIG. 5. The circulation mechanism is configured to feed the ink in the ink circulation chamber 65 to the ink reservoirs R, that is, configured to circulate the ink. The circulation mechanism 75 may include, for example, a suction mechanism, such as a pump, that sucks ink from the ink circulation chamber 65, a filter mechanism operable to remove air bubbles and foreign matter from the ink, and a heating mechanism operable to heat the ink to reduce the viscosity of the ink. These mechanisms are not shown in the figure. After removing the air bubbles and foreign matter from the ink and reducing the viscosity of the ink in the circulation mechanism 75, the ink is fed to the ink reservoirs R from the circulation mechanism 75 through the respective inlets 482. Thus, the ink is circulated in the following order: the ink reservoirs R, the feed paths 61, the pressure chambers C, the communication paths 63, the circulation paths 72, the ink circulation chamber 65, the circulation mechanism 75, and the ink reservoirs R.

The circulation mechanism 75 sucks the ink from both sides in the Y direction of the ink circulation chamber 65, as shown in FIG. 5. In other words, the circulation mechanism 75 sucks the ink from the vicinity of the end of the ink circulation chamber 65 on the negative side in the Y direction and the vicinity of the end of the ink circulation chamber 65 on the negative side in the Y direction. It should be noted that a structure operable to suck an ink from only one end of the ink circulation chamber 65 in the Y direction may produce a difference in pressure between the ends of the ink circulation chamber 65, and that this difference may vary the pressure in the communication paths aligned in the Y direction. Consequently, the performance of ink ejection from the nozzles N, such as ejection amount or ejection rate, may vary in the Y direction. In contrast to such a structure, the structure of the present embodiment sucks ink from both sides of the ink circulation chamber 65, thus reducing pressure difference in the ink circulation chamber 65. Accordingly, ejection performance can be even throughout the nozzles N aligned in the Y direction. In an embodiment, however, the ink may be sucked from one end of the ink circulation chamber 65 if pressure varying in the Y direction in the ink circulation chamber 65 does not matter.

Thus, the ink jet apparatus 100 of the present embodiment includes an ink jet head 26 including: a nozzle plate 52 having first nozzles and second nozzles; a flow path portion 30 having first pressure chambers and second pressure chambers to which an ink is supplied, first communication paths connecting the first nozzles individually to the corresponding first pressure chambers, second communication paths connecting the second nozzles individually to the corresponding second pressure chambers, and an ink circulation chamber 65 between the arrangement of the first communication paths and the arrangement of the second communication paths; and a pressure generating section configured to vary the pressure in each of the first pressure chambers and the second pressure chambers. The nozzle plate 52 has first circulation paths connecting the first communication paths to the ink circulation chamber 65 and second circulation paths connecting the second communication paths to the ink circulation chamber 65.

Second Embodiment

Figure 7:
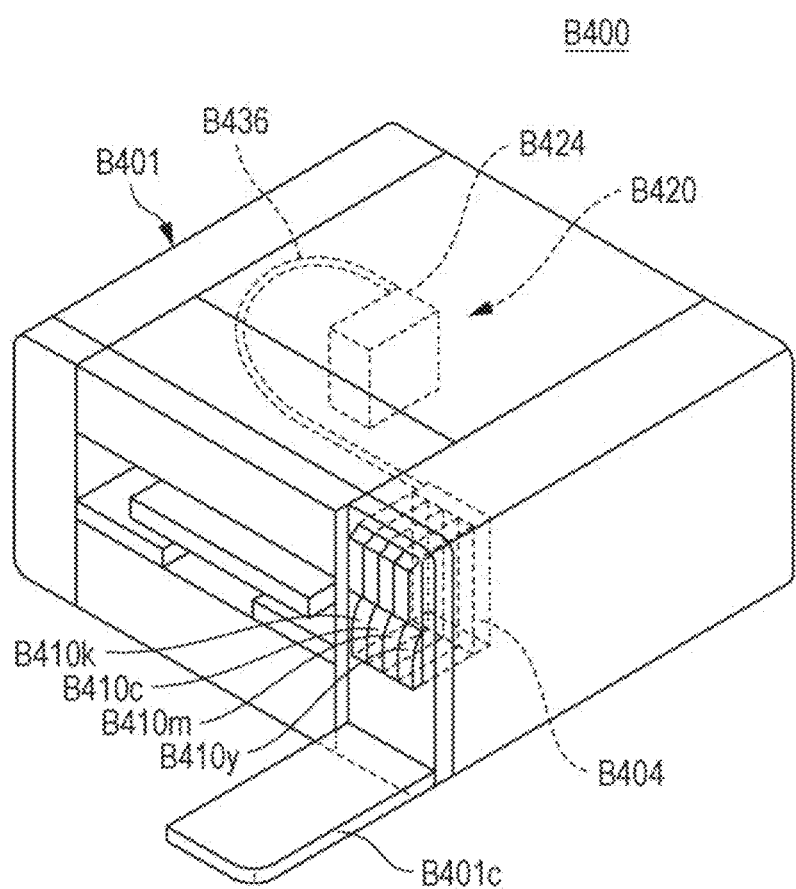
FIG. 7 is a perspective view of an ink jet apparatus according to a second embodiment of the present disclosure.
Figure 8:
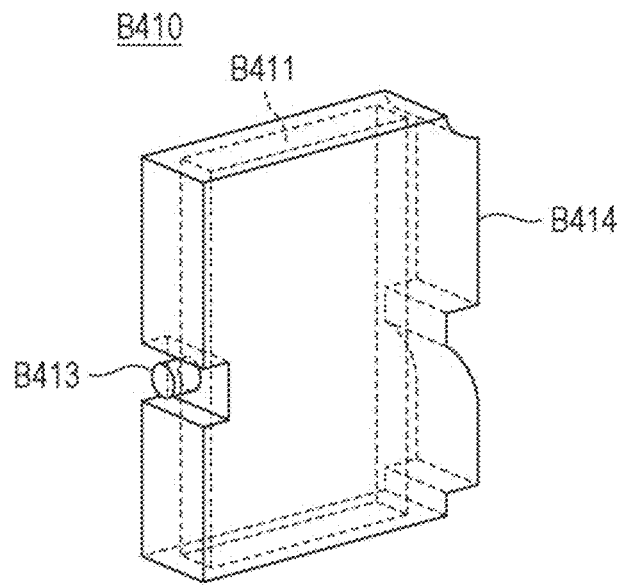
FIG. 8 is a perspective view of the main tank of the ink jet apparatus shown in FIG. 7.
Figure 9:
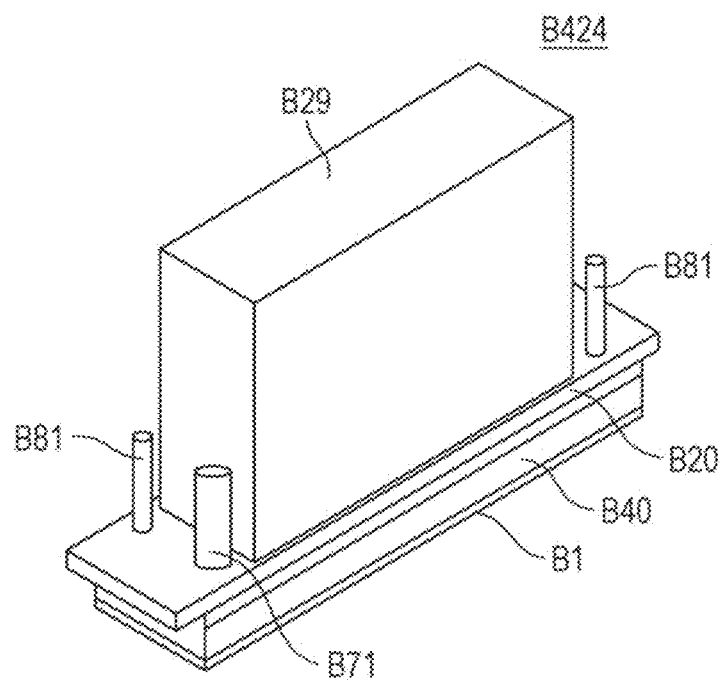
FIG. 9 is an external perspective view of an ink jet head of the ink jet apparatus shown in FIG. 7.
Figure 10:
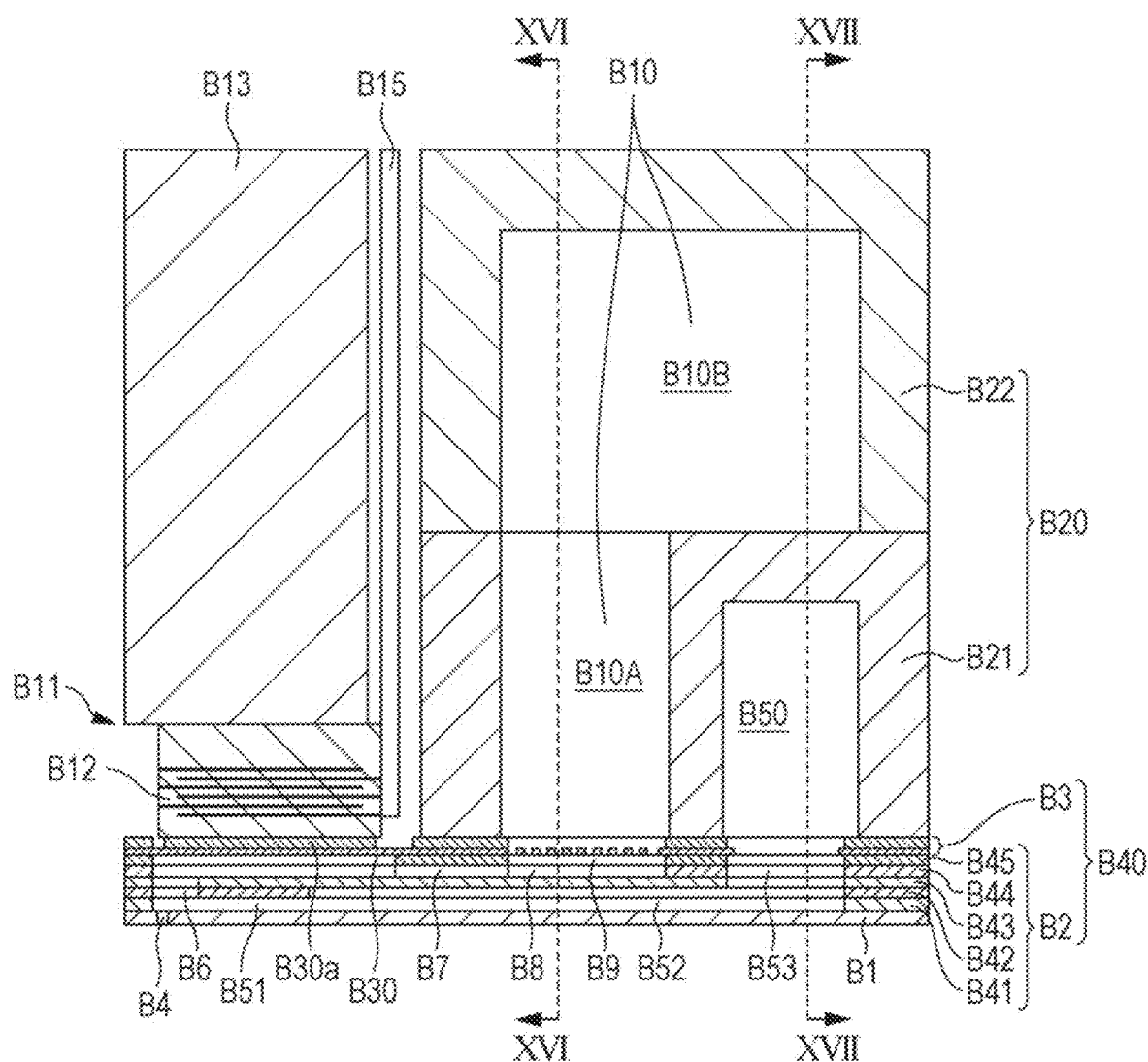
FIG. 10 is a sectional view of the ink jet head shown in FIG. 9, taken in a direction perpendicular to the nozzle alignment.
Figure 11:
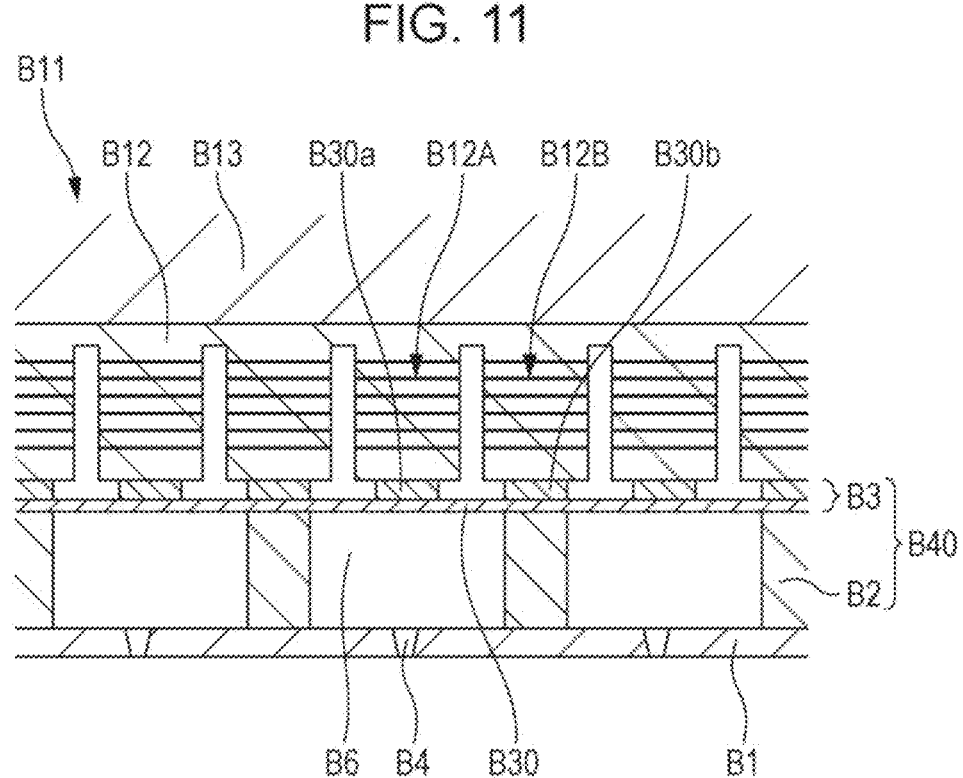
FIG. 11 is a sectional view of the ink jet head shown in FIG. 9, taken in a direction parallel to the nozzle alignment.
Figure 12:
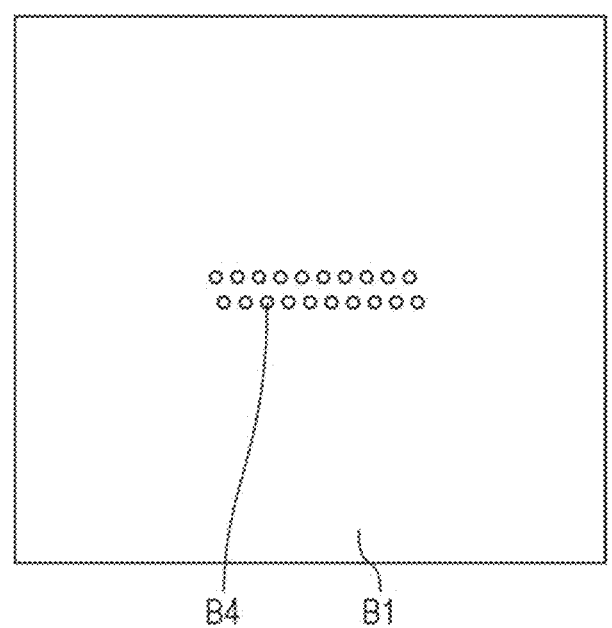
FIG. 12 is a plan view of the nozzle plate of the ink jet head shown in FIG. 9.
Figure 14A:
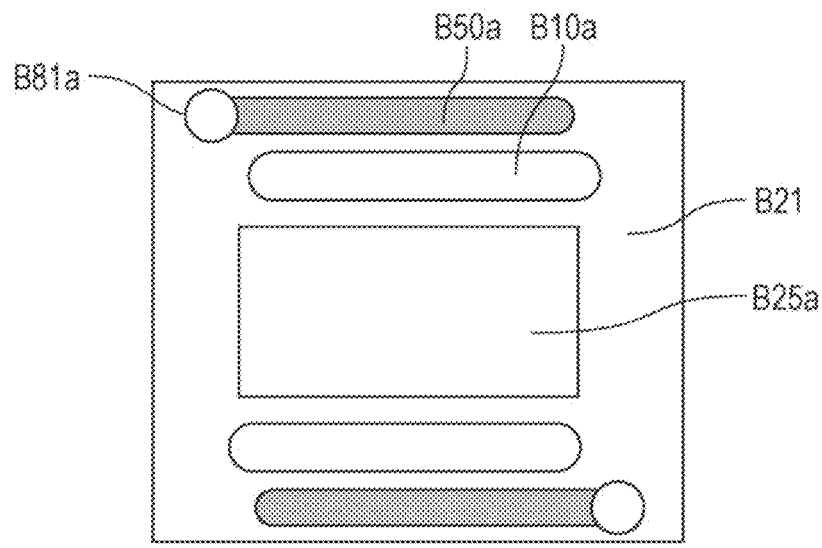
FIG. 14A is a plan view of a member of a common ink chamber section of the ink jet head shown in FIG. 9.
Figure 14B:
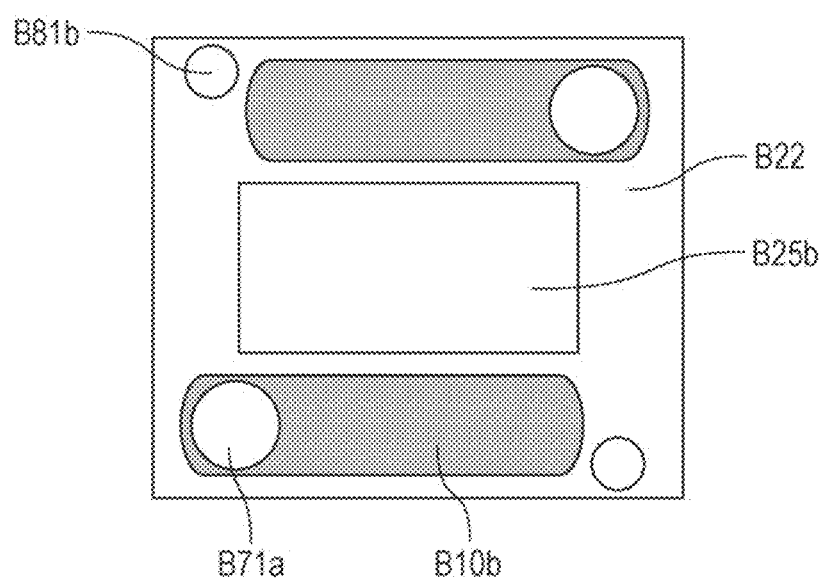
FIG. 14B is a plan view of a member of the common ink chamber section of the ink jet head shown in FIG. 9.
Figure 15:
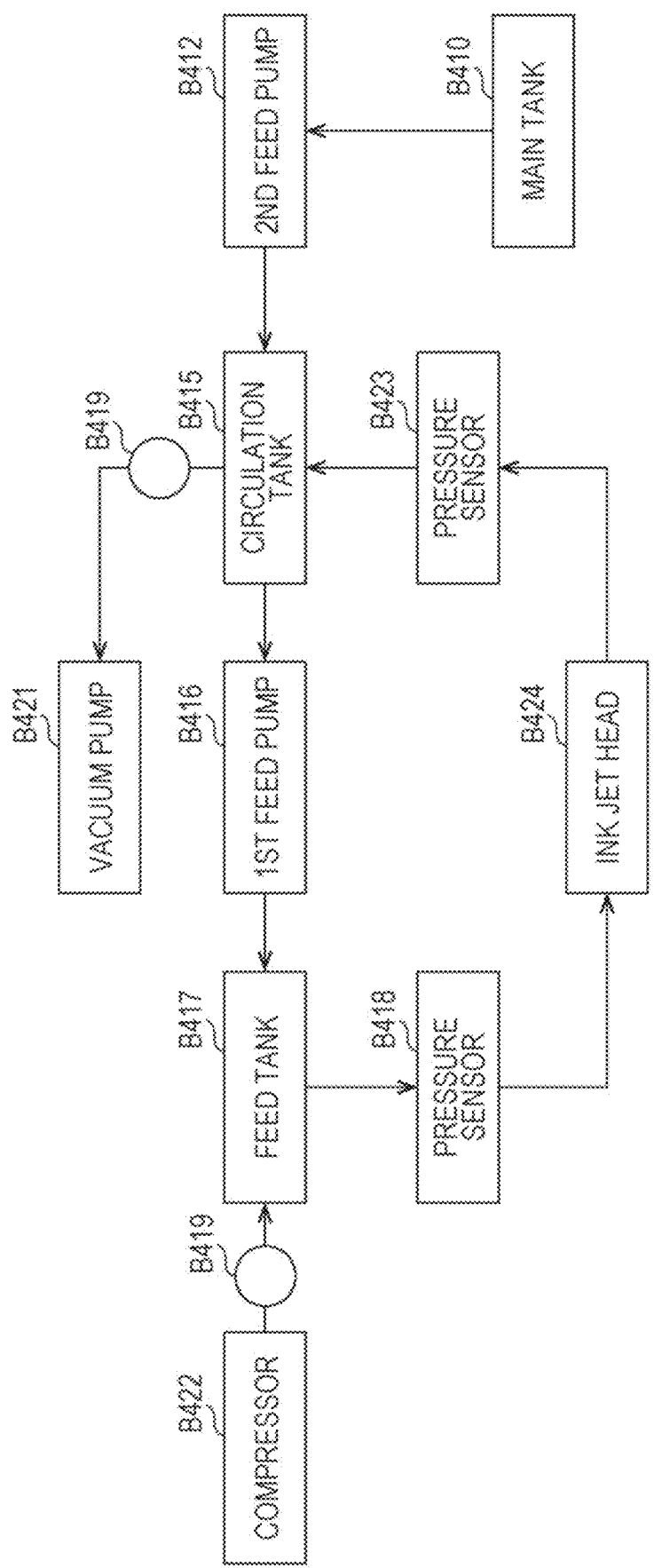
FIG. 15 is a block diagram of an exemplary ink circulation system of an ink jet apparatus according to a second embodiment of the present disclosure.
Figure 16:
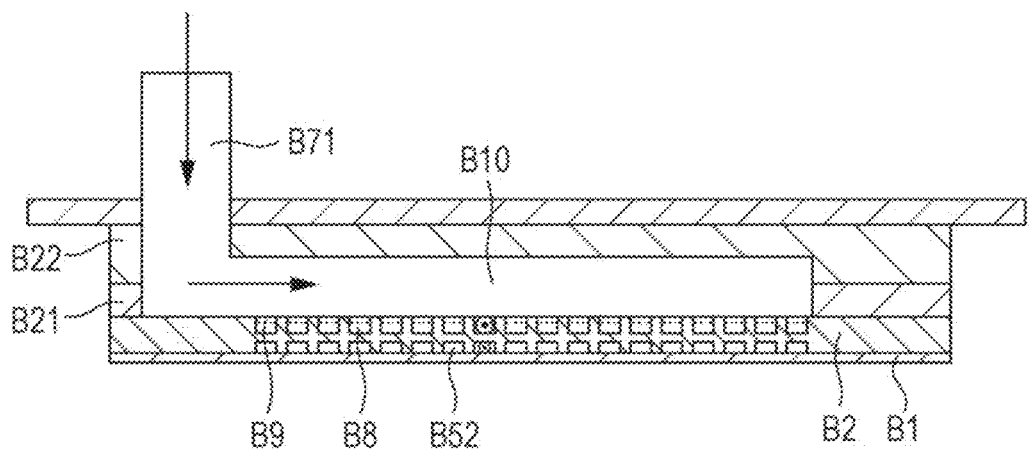
FIG. 16 is a sectional view taken along line XVI-XVI in FIG. 10.
Figure 17:
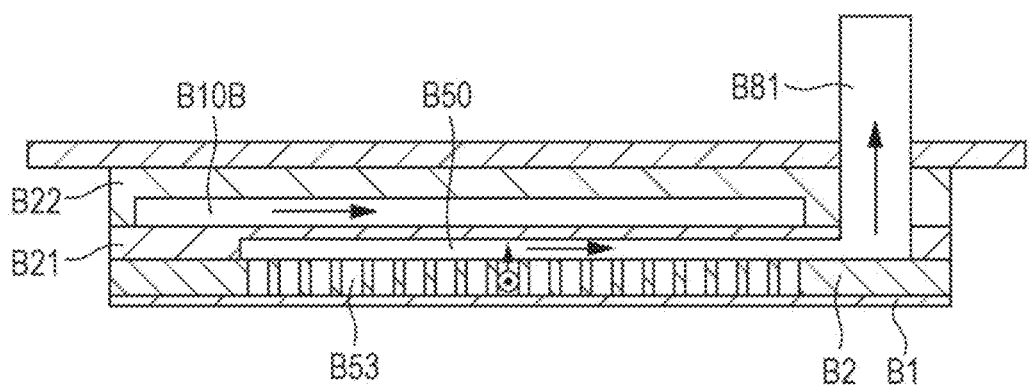
FIG. 17 is a sectional view taken along line XVII-XVII in FIG. 10.

FIG. 7 is a perspective view of an ink jet apparatus according to a second embodiment of the present disclosure. FIG. 8 is a perspective view of the main tank of the ink jet apparatus shown in FIG. 7. FIG. 9 is an external perspective view of the ink jet head of the ink jet apparatus shown in FIG. 7. FIG. 10 is a sectional view of the ink jet head shown in FIG. 9, taken in a direction perpendicular to the nozzle alignment. FIG. 11 is a sectional view of the ink jet head shown in FIG. 9, taken in a direction parallel to the nozzle alignment. FIG. 12 is a plan view of the nozzle plate of the ink jet head shown in FIG. 9. FIGS. 13A to 13F are plan views of members of a flow path section of the ink jet head shown in FIG. 9. FIGS. 14A and 14B are plan views of members of a common ink chamber section of the ink jet head shown in FIG. 9. FIG. 15 is a block diagram of an exemplary ink circulation system of the ink jet apparatus according to the present embodiment. FIG. 16 is a sectional view taken along line XVI-XVI in FIG. 10. FIG. 17 is a sectional view taken along line XVII-XVII in FIG. 10.

An ink jet apparatus B400 includes an enclosure B401 and a mechanism section B420 within the enclosure. Main tanks B410 include a main tank B410k, a main tank B410c, a main tank B410m, and a main tank B410y for black color, cyan color, magenta color, and yellow color, respectively. Each main tank has an ink container B411 made of, for example, a packaging material, such as an aluminum laminate film. The ink container B411 is accommodated in, for example, a container case B414 made of a plastic. Thus, the main tanks B410 are used as ink cartridges for the respective colors.

A cartridge holder B404 is provided at the back of the opening that appears when a cover B401c of the apparatus body is open. The main tanks B410 are removably mounted in the cartridge holder B404. Thus, the outlet B413 of each main tank B410 communicates with an ink jet head B424 for any of the colors through a feed tube B436, so that the inks are ejected from the respective ink jet heads B424 onto a printing medium, or cloth.

The ink jet head B424 includes a stack of a nozzle plate B1, a flow path plate B2, and a vibration plate member B3 acting as a wall member. Also, the ink jet head B424 includes a piezoelectric actuator B11 configured to displace the vibration plate member B3, a common ink chamber section B20, and a cover B29. The nozzle plate B1 has a plurality of nozzles B4 through which an ink is ejected.

The flow path plate B2 has discrete ink chambers B6 communicating individually with the nozzles B4, flow resistance portions B7 communicating with the discrete ink chambers B6, and ink inlets B8 communicating with the flow resistance portions B7. The flow path plate B2 includes a plurality of plate members B41, B42, B43, B44, and B45 that are stacked in this order on the nozzle plate B1. A stack of these plate members B41, B42, B43, B44, and B45 and the vibration plate member B3 define a flow path section B40.

The vibration plate member B3 has a filter portion B9 acting as openings connecting the ink inlets B8 to a common ink chamber B10 formed in the common ink chamber section B20.

The vibration plate member B3 is a wall member defining walls of the discrete ink chambers B6 in the flow path plate B2. The vibration plate member B3 has a double-layer structure composed of a first thin layer adjacent to the flow path plate B2 and a second thick layer. The portion of the first layer corresponding to the positions of the discrete ink chambers B6 is a deformable vibration region B30.

The nozzle plate B1 has a plurality of nozzles B4 arranged in a staggered manner, as shown in FIG. 12.

Figure 13A:
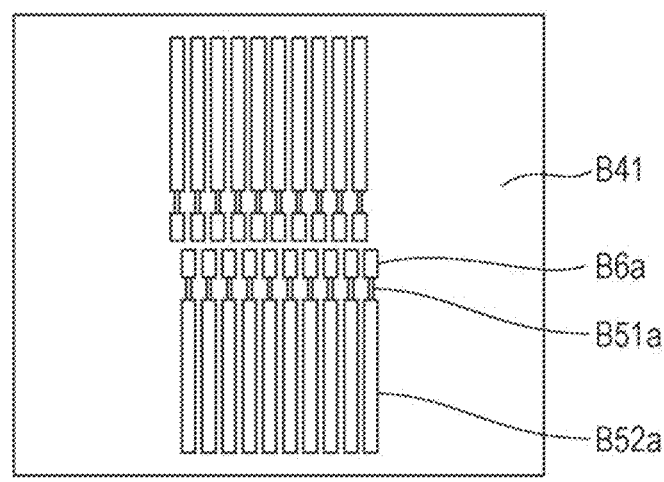
FIG. 13A is a plan view of a member of a flow path section of the ink jet head shown in FIG. 9.

The plate member B41 of the flow path plate B2 is provided therein with through-grooves B6a individually defining a part of the discrete ink chambers B6, and through-grooves B51a and B52a defining flow resistance portions B51 and a part of the circulation paths B52, as shown in FIG. 13A.

Figure 13B:
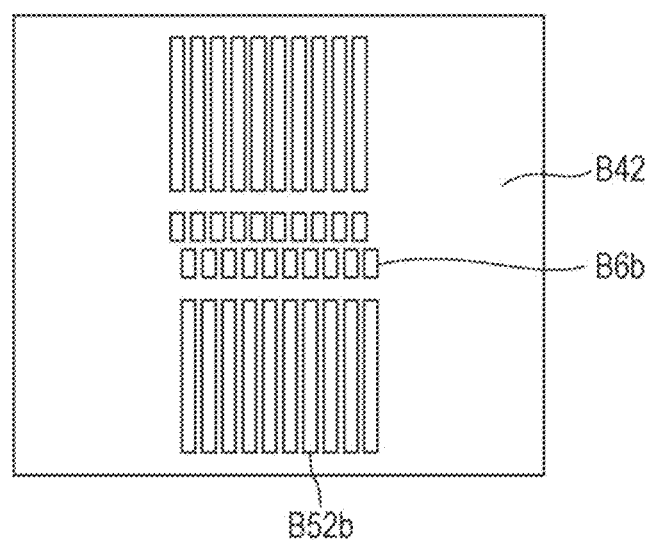
FIG. 13B is a plan view of a member of the flow path section of the ink jet head shown in FIG. 9.

The plate member B42 of the flow path plate B2 is provided therein with through-grooves B6b individually defining a part of the discrete ink chambers B6, and through-grooves B52b individually defining a part of the circulation paths B52, as shown in FIG. 13B.

Figure 13C:
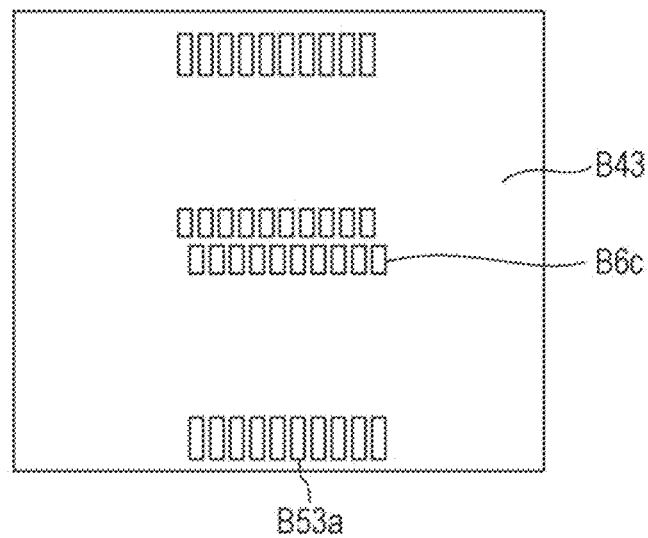
FIG. 13C is a plan view of a member of the flow path section of the ink jet head shown in FIG. 9.

The plate member B43 of the flow path plate B2 is provided therein with through-grooves B6c individually defining a part of the discrete ink chambers B6, and through-grooves B53a that are long in a direction perpendicular to the direction of the nozzle alignment and individually define a part of the circulation paths B53, as shown in FIG. 13C.

Figure 13D:
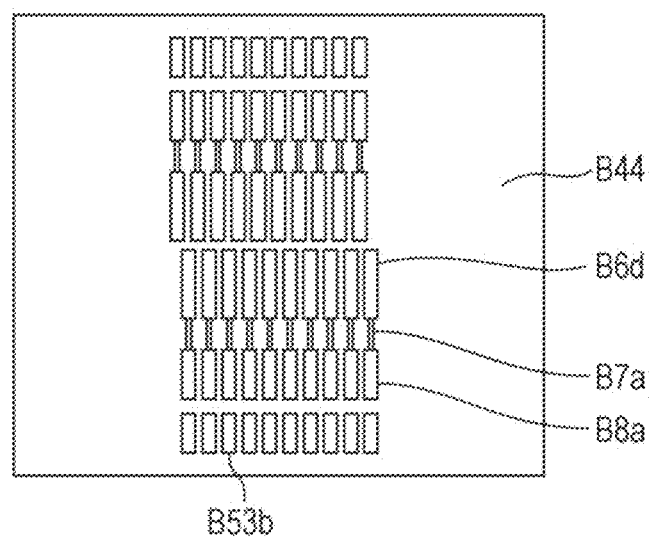
FIG. 13D is a plan view of a member of the flow path section of the ink jet head shown in FIG. 9.

The plate member B44 of the flow path plate B2 is provided therein with through-groves B6d individually defining a part of the discrete ink chambers B6, through-grooves B7a individually defining a part of the flow resistance portions B7, through-grooves B8a individually defining the ink inlets B8, and through-grooves B53b that are long in a direction perpendicular to the direction of the nozzle alignment and that individually define a part of the circulation paths B53, as shown in FIG. 13D.

Figure 13E:
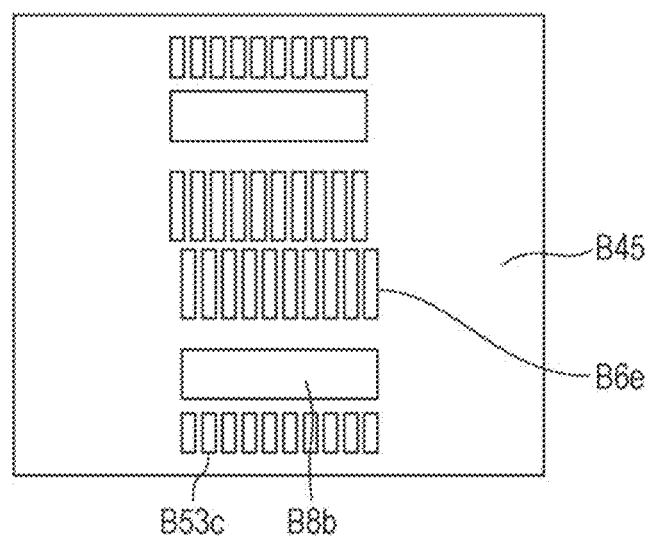
FIG. 13E is a plan view of a member of the flow path section of the ink jet head shown in FIG. 9.

The plate member B45 of the flow path plate B2 is provided therein with through-groves B6e individually defining a part of the discrete ink chambers B6, and through-grooves B8b that extend in the direction of the nozzle alignment and that define ink inlets acting as ink chambers downstream of the filter, and through-grooves B53c that are long in a direction perpendicular to the direction of the nozzle alignment and that individually define a part of the circulation paths B53, as shown in FIG. 13E.

Figure 13F:
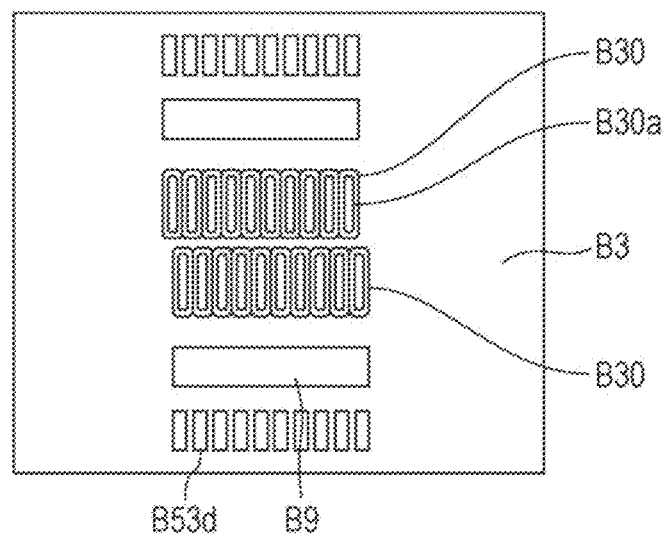
FIG. 13F is a plan view of a member of the flow path section of the ink jet head shown in FIG. 9.

The vibration plate member B3 is provided therein with vibration regions B30, filter portions B9, and through-grooves B53*d* that are long in a direction perpendicular to the direction of the nozzle alignment and that individually define a part of the circulation paths B53, as shown in FIG. 13F.

The flow path section is thus defined by a stack of the plate members to form complex flow paths in a simple structure.

Thus, the flow path section B40 including the flow path plate B2 and the vibration plate member B3 has flow resistance portions B51 extending in plane direction in the flow path plate B2 and communicating with the discrete ink chambers B6, circulation paths B52, and circulation paths B53 having a height in the thickness direction of the flow path section B40 and communicating with the circulation paths B52. The circulation paths B53 communicate with a common ink circulation chamber B50 described later herein.

The common ink chamber section B20 has a common ink chamber B10 and a common ink circulation chamber B50.

The common ink chamber section B20 includes a first common ink chamber member B21. The first common ink chamber member B21 is provided therein with a through-hole B25*a* for the piezoelectric actuator, through-grooves B10*a* defining downstream common ink chambers B10A, and closed grooves B50*a* defining common ink circulation chambers B50, as shown in FIG. 14A.

The common ink chamber section B20 also includes a second common ink chamber member B22. The second common ink chamber member B22 is provided therein with a through-hole B25*a* for the piezoelectric actuator, and through-grooves B10*b* defining upstream common ink chambers B10B, as shown in FIG. 14B.

The second common ink chamber member B22 is also provided therein with through-holes B71*a* individually defining a feed port connecting one end in the direction of the nozzle alignment of the common ink chamber B10 to a feed port B71.

Similarly, the first common ink chamber member B21 and the second common ink chamber member B22 are provided therein with through-holes B81*a* and B81*b*, respectively, at the other end in the direction of the nozzle alignment. The through-holes B81*a* and B81*b* connect the corresponding common ink circulation chamber B50 to a circulation port B81.

In FIGS. 14A and 14B, the closed grooves, that is, the grooves with a bottom, are denoted by filled shapes. The same applies to the drawings used for the description below.

As described above, the common ink chamber section B20 includes the first common ink chamber member B21 and the second common ink chamber member B22. In this structure, the first common ink chamber member B21 is joined to the vibration plate member B3 of the flow path section B40, and the second common ink chamber member B22 is disposed on and joined to the first common ink chamber member B21.

The first common ink chamber member B21 defines downstream common ink chambers B10A that are individually a part of the common ink chambers B10 communicating with the ink inlets B8, and the common ink circulation chambers B50 communicating with the circulation paths B53. Also, the second common ink chamber member B22 defines the upstream common ink chambers B10B that are individually the rest of the upstream common ink chambers B10.

In this instance, the downstream common ink chamber B10A, which is a part of the common ink chamber B10, and the common ink circulation chamber B50 are arranged side by side in a direction perpendicular to the nozzle alignment, and the common ink circulation chamber B50 is located so as to be projected onto a position in the common ink chamber B10.

In such a structure, the dimensions of the common ink circulation chamber B50 are not constrained by the dimensions of the discrete ink chambers B6 and flow paths including the flow resistance portions B7 and ink inlets B8 in the flow path section B40.

In the structure in which the common ink circulation chamber B50 and a portion of the common ink chamber B10 are arranged side by side and the common ink circulation chamber B50 is located so as to be projected onto a position in the common ink chamber B10, the width of the ink jet head, that is, the measurement of the head in a direction perpendicular to the nozzle alignment, is reduced, preventing the increase in size of the head. The common ink chamber section B20 defines common ink chambers B10 to which an ink is supplied from a head tank or an ink cartridge, and common ink circulation chambers B50.

A piezoelectric actuator B11 is disposed on the vibration plate member B3 on the side opposite the discrete ink chambers B6. The piezoelectric actuator B11 includes an electromechanical conversion element acting as a driving device to deform the vibration regions B30 of the vibration plate member B3.

As shown in FIG. 11, the piezoelectric actuator B11 includes a piezoelectric member B12 joined onto a base member B13, and the piezoelectric member B12 has a predetermined number of columnar piezoelectric elements B12A and B12B formed in grooves by half-cut dicing so as to be arranged in a comb-like manner at predetermined intervals.

The piezoelectric elements B12A of the piezoelectric member B12 act to apply driving waves for operation, while the piezoelectric elements B12B act as merely pillars without applying driving waves. In an embodiment, however, all the piezoelectric elements B12A and B12B may be used as piezoelectric elements to be operated.

The piezoelectric elements B12A are coupled to protrusions B30*a* that are thick portions formed in an island manner at the vibration region B30 of the vibration plate member B3. The piezoelectric elements B12B are coupled to protrusions B30*b* that are thick portions formed in an island manner at the vibration region B30 of the vibration plate member B3.

The piezoelectric member B12 is defined by alternately stacking piezoelectric layers and inner electrodes. The inner electrodes are extracted to either side, and the ends of the inner electrodes are provided with an external electrode coupled to a flexible wiring member B15.

In the ink jet head B424 having such a structure, which is a circulation-type ejection head, the piezoelectric elements B12A are contracted by, for example, reducing the voltage applied to the piezoelectric elements B12A from a standard potential. Consequently, the vibration region B30 of the vibration palate member B3 falls to expand the capacity of the discrete ink chambers B6, thus causing an ink to flow into the discrete ink chambers B6.

Then, the voltage applied to the piezoelectric elements B12A is reduced to expand the piezoelectric elements B12A in the stacking direction. Thus, the vibration region B30 of the vibration plate member B3 is deformed in the direction toward the nozzles B4 to reduce the capacity of the discrete ink chambers B6 and increase the pressure in the discrete ink chambers B6, thereby ejecting an ink from the nozzles B4.

Then, the vibration region B30 of the vibration plate member B3 is returned to the initial position to expand the discrete ink chambers B6 by increasing the reduced voltage applied to the piezoelectric elements B12A to the standard potential again. Consequently, a negative pressure is generated in the discrete ink chambers B6, and, thus, an ink is introduced into the discrete ink chambers B6 from the common ink chamber B10. After the vibration of the meniscuses formed at the nozzles B4 is attenuated and stabilized, the operation moves on to a subsequent ejection operation.

The method of operating the head is not limited to the above-described embodiment, and pulling ejection or pushing ejection may be performed by changing the method for applying driving waves. In the above-described embodiment, multilayer piezoelectric elements are used as pressure generators to vary the pressure in discrete ink chambers B6. In an embodiment, however, thin piezoelectric elements may be used without limitation to the multilayer type. Alternatively, the pressure in the discrete ink chambers B6 may be varied by using electrostatic force, or by air bubbles generated by the heat of heating resistors disposed in discrete ink chambers B6.

An ink circulation system using a circulation-type ink jet head will now be described with reference to FIG. 15.

The ink circulation system shown in FIG. 15 includes a main tank B410, an ink jet head B424, a feed tank B417, a circulation tank B415, a compressor B422, a vacuum pump B421, a first feed pump B416, a second feed pump B412, a regulator B419, a pressure sensor B418 on the feed side, and a pressure sensor B423 on the circulation side. The pressure sensor B418 on the feed side is disposed between the feed tank B417 and the ink jet head B424 and is connected to the feed paths connected to a feed port B71. The pressure sensor B423 on the circulation side is disposed between the ink jet head B424 and the circulation tank B415 and is connected to the circulation paths connected to a circulation port B81.

The circulation tank B415 is connected to the feed tank B417 via the first feed pump B416 at one end thereof, and is also connected to the main tank B410 via the second feed pump B412 at the other end. Thus, an ink is introduced into the ink jet head B424 from the feed tank B417 through the feed port B71, then delivered to the circulation tank B415 through the circulation port B81, and further delivered to the feed tank B417 from the circulation tank B415 with the first feed pump B416, thus circulating.

The feed tank B417 is connected to the compressor B422, and the pressure is controlled so that a predetermined positive pressure can be detected by the pressure sensor B418 on the feed side. On the other side, the circulation tank B415 is connected to the vacuum pump B421, and the pressure is controlled so that a predetermined negative pressure can be detected by the pressure sensor B423 on the circulation side. Thus, the pressure on meniscuses is kept constant and negative while the ink is circulated through the ink jet head B424.

Since the amount of ink in the feed tank B417 and the circulation tank B415 decreases as the ink jet head B424 ejects droplets through the nozzles B4, it is beneficial to refill the circulation tank B410 with the ink by feeding the ink from the main tank B410 by using the second feed pump B412. The refilling of the circulation tank B415 from the main tank B410 may be performed, for example, when the level of the ink in the circulation tank B415 falls to lower than a predetermined height. Thus, the timing of the refilling may be controlled depending on the detection result of a level sensor or the like equipped in the circulation tank B415.

The circulation of the ink in the ink jet head B424 will now be described. The feed port B71 communicating with the common ink chamber B10 and the circulation port B81 communicating with the common ink circulation chamber B50 are provided at ends of the common ink chamber section B20. The feed port B71 and the circulation port B81 are connected to the feed tank B417 and the circulation tank B415, respectively, with a tube therebetween. The ink in the feed tank B417 is fed to the discrete ink chambers B6 through the feed port B71, the common ink chamber B10, the ink inlets B8, and the flow resistance portions B7.

While the ink in the discrete ink chambers B6 is ejected through the nozzles B4 by the operation of the piezoelectric member B12, at least part of the ink remaining in the discrete ink chambers B6 without being ejected is circulated and delivered to the circulation tank B415 through the flow resistance portions B51, the circulation paths B52 and B53, and the common ink circulation chamber B50, and the circulation port B81.

The ink may be circulated not only during the operation of the ink jet head B424 but also during a pause of operation. By circulating the ink during pauses of the operation, the ink in the discrete ink chambers B6 can be always fresh, and the constituents are prevented from flocculating and selling.

Dyed Product

A dyed product, or a printed item, of the present disclosure is produced by using the above-described ink jet textile printing ink according to an embodiment of the present disclosure and may be produced by, for example, the above-described ink jet textile printing method.

Thus, a desired pattern can be formed with the ink jet textile printing ink, and cloth can be favorably dyed to yield a dyed product including a dyed portion defined by a desired pattern.

While the subject matter of the present disclosure has been described with reference to exemplary embodiments, it is to be understood that the subject matter is not limited to the disclosed embodiments. For example, the ink jet apparatus used in the embodiments of the present disclosure is not limited to the structure disclosed herein.

EXAMPLES

Examples of the subject matter of the present disclosure will now be described.

1. Preparation of Ink Jet Textile Printing Inks

Example 1

First, the following constituents were prepared: C.I. Acid Black 172 that is an acid dye as a water-soluble dye; triethylene glycol monobutyl ether, propylene glycol, and triethanolamine as water-soluble organic solvents; urea; active carbon particles having a specific particle size distribution; and pure water.

Ink jet textile printing ink having compositions presented in Table 1 were prepared by mixing these constituents in predetermined proportions.

The contents presented in Table 1 are proportions (mass %) of the mass of the constituent relative to the total mass of the water-soluble constituents in the composition not containing solid active carbon particles. This applies to all the contents used herein.

Examples 2 to 12

Ink jet textile printing inks were prepared in the same manner as in Example 1, except that the materials of the constituents used in the ink jet textile printing ink, the particle size distribution of active carbon particles in the ink, and the proportions of the constituents were controlled according to the composition presented in Table 1.

Comparative Examples 1 to 10

Ink jet textile printing inks were prepared in the same manner as in Example 1, except that the materials of the constituents used in the ink jet textile printing ink, the particle size distribution of active carbon particles in the ink, and the proportions of the constituents were controlled according to the composition presented in Table 1.

Table 1 presents the conditions of the ink jet textile printing ink of each of the Examples and Comparative Examples together. "%" in Table 1 represents percent by mass (mass %). For the measurements of the particle size of the active carbon particles presented in Table 1, nano-level particles sizes from 50 nm to 1000 nm were measured with a particle size distribution analyzer MT3300 EXII manufactured by MicrotracBEL, and micro-level particle sizes of 2000 nm or more were measured with an analyzer FPIA-3000 manufactured by Sysmex. In Table 1, the water-soluble dye "AK172" represents C.I. Acid Black 172; a water-soluble organic solvent "TEGBE" represents triethylene glycol monobutyl ether; a water-soluble organic solvent "PG" represents propylene glycol; and a water-soluble organic solvent "TEA" represents triethanolamine. Each of the ink jet textile printing inks of the Examples had a surface tension in the range of 23 mN/m to 30 mN/m. The surface tension was measured at 25° C. by a Wilhelmy method using a surface tensiometer CBVP-7 (manufactured by Kyowa Interface Science). The viscosity of each ink jet textile printing ink was in the range of 4 mPa·s to 6 mPa·s at 25° C. The viscosity of the ink jet textile printing inks was measured in accordance with JIS Z8809 using a vibration viscometer VM-100 manufactured by SECONIC.

2. Evaluation 2.1. Ejection Consistency

Each ink jet textile printing ink of the Examples and Comparative Examples, immediately after preparation was placed into a predetermined ink container.

Then, the ink container was mounted in the ink jet apparatus shown in FIGS. 1 to 6. After being circulated, the ink jet textile printing ink was ejected to be applied onto an A4 plain paper being a printing medium, thus forming a solid pattern at a print dissolution of 1440 dpi×720 dpi. The ink jet printer, or the ink jet apparatus, was operated at 40° C., 20 RH %. The ratio of the flow rate of circulated ink jet textile printing ink to the maximum rate of ejection from the ink jet head was controlled to 5.

The number of nozzles failed in ejection was counted by checking the solid patterns printed on 30 printing medium sheets, and ejection consistency was evaluated according to the following criteria. The smaller the number of nozzles failed in ejection, the better the ejection consistency. C or higher rating is considered to be good.

A: The ratio of the number of failed nozzles to the number of all the nozzles was 0%.

B: The ratio of the number of failed nozzles to the number of all the nozzles was more than 0% to 0.5%.

C: The ratio of the number of failed nozzles to the number of all the nozzles was more than 0.5% to 1.0%.

D: The ratio of the number of failed nozzles to the number of all the nozzles was more than 1.0% to 1.5%.

E: The ratio of the number of failed nozzles to the number of all the nozzles was more than 1.5%.

TABLE 1

| | Water-soluble dye | | Active carbon particles | | | | | Water-soluble organic solvent | | | | |
| | | | Number of particles (/mL) | | | Average | Largest | TEGBE | PG | TEA | Urea | Water |
| | Dye | Content (%) | 50 nm to 1000 nm | 50 nm to 200 nm | 2000 nm or more | particle size (nm) | particle size (nm) | Content (%) | Content (%) | Content (%) | Content (%) | Content (%) |
|---|---|---|---|---|---|---|---|---|---|---|---|---|
| Example 1 | AK172 | 10.0 | 3000 | 2000 | 500 | 150 | 8000 | 5.0 | 10.0 | 0.1 | 3.0 | Balance |
| Example 2 | AK172 | 10.0 | 7500 | 5000 | 1000 | 150 | 8000 | 5.0 | 10.0 | 0.1 | 3.0 | Balance |
| Example 3 | AK172 | 10.0 | 30000 | 20000 | 4000 | 150 | 8000 | 5.0 | 10.0 | 0.1 | 3.0 | Balance |
| Example 4 | AK172 | 5.0 | 3000 | 2000 | 500 | 150 | 8000 | 5.0 | 10.0 | 0.1 | 3.0 | Balance |
| Example 5 | AK172 | 5.0 | 30000 | 20000 | 4000 | 150 | 8000 | 5.0 | 10.0 | 0.1 | 3.0 | Balance |
| Example 6 | AK172 | 20.0 | 3000 | 2000 | 500 | 150 | 8000 | 5.0 | 10.0 | 0.1 | 3.0 | Balance |
| Example 7 | AK172 | 20.0 | 30000 | 20000 | 4000 | 150 | 8000 | 5.0 | 10.0 | 0.1 | 3.0 | Balance |
| Example 8 | AK172 | 10.0 | 5100 | 5000 | 100 | 50 | 8000 | 5.0 | 10.0 | 0.1 | 3.0 | Balance |
| Example 9 | AK172 | 10.0 | 10000 | 5000 | 3000 | 200 | 8000 | 5.0 | 10.0 | 0.1 | 3.0 | Balance |
| Example 10 | AK172 | 10.0 | 500 | 333 | 80 | 150 | 8000 | 5.0 | 10.0 | 0.1 | 3.0 | Balance |
| Example 11 | AK172 | 10.0 | 300000 | 200000 | 40000 | 150 | 8000 | 5.0 | 10.0 | 0.1 | 3.0 | Balance |
| Example 12 | AK172 | 10.0 | 300000 | 280000 | 6000 | 50 | 8000 | 5.0 | 10.0 | 0.1 | 3.0 | Balance |
| Comparative Example 1 | AK172 | 3.0 | 3000 | 2000 | 500 | 150 | 8000 | 5.0 | 10.0 | 0.1 | 3.0 | Balance |
| Comparative Example 2 | AK172 | 3.0 | 30000 | 20000 | 4000 | 150 | 8000 | 5.0 | 10.0 | 0.1 | 3.0 | Balance |
| Comparative Example 3 | AK172 | 30.0 | 3000 | 2000 | 500 | 150 | 8000 | 5.0 | 10.0 | 0.1 | 3.0 | Balance |
| Comparative Example 4 | AK172 | 30.0 | 30000 | 20000 | 4000 | 150 | 8000 | 5.0 | 10.0 | 0.1 | 3.0 | Balance |
| Comparative Example 5 | AK172 | 10.0 | 90 | 60 | 10 | 150 | 8000 | 5.0 | 10.0 | 0.1 | 3.0 | Balance |
| Comparative Example 6 | AK172 | 10.0 | 300 | 200 | 50 | 150 | 8000 | 5.0 | 10.0 | 0.1 | 3.0 | Balance |
| Comparative Example 7 | AK172 | 10.0 | 400 | 350 | 10 | 50 | 8000 | 5.0 | 10.0 | 0.1 | 3.0 | Balance |
| Comparative Example 8 | AK172 | 10.0 | 500000 | 330000 | 50000 | 150 | 8000 | 5.0 | 10.0 | 0.1 | 3.0 | Balance |
| Comparative Example 9 | AK172 | 10.0 | 900000 | 600000 | 90000 | 150 | 8000 | 5.0 | 10.0 | 0.1 | 3.0 | Balance |
| Comparative Example 10 | AK172 | 10.0 | 500000 | 30000 | 80000 | 500 | 8000 | 5.0 | 10.0 | 0.1 | 3.0 | Balance |

2.2. Storage Stability

Each ink jet textile printing ink of the Examples and Comparative Examples was placed into a predetermined ink container and allowed to stand at 60° C. for 5 days.

After that, the ink jet textile printing ink mounted in the ink jet apparatus was ejected in the same manner as in the above 2. 1. Thus printed patterns were evaluated according to the same criteria. The results are presented in Table 2.

TABLE 2

|  | Ejection consistency | Storage stability |
| --- | --- | --- |
| Example 1 | A | A |
| Example 2 | A | A |
| Example 3 | A | A |
| Example 4 | A | A |
| Example 5 | A | A |
| Example 6 | A | A |
| Example 7 | A | A |
| Example 8 | A | A |
| Example 9 | A | A |
| Example 10 | A | B |
| Example 11 | B | B |
| Example 12 | B | B |
| Comparative Example 1 | D | D |
| Comparative Example 2 | D | D |
| Comparative Example 3 | D | E |
| Comparative Example 4 | D | E |
| Comparative Example 5 | A | D |
| Comparative Example 6 | A | E |
| Comparative Example 7 | A | E |
| Comparative Example 8 | D | D |
| Comparative Example 9 | E | E |
| Comparative Example 10 | E | E |

As is clear from the results presented in Table 2, the ink jet textile printing inks according to the present disclosure produced satisfactory results. On the other hand, the Comparative Examples did not provide satisfactory results.

The same evaluation was performed by using other ink jet textile printing inks prepared under the same conditions of the above-described Examples and Comparative Examples except that C.I. Acid Black 172 used as the water-soluble dye was replaced with any of the following water-soluble dyes: C.I. Reactive Black 39, C.I. Reactive Orange 13, C.I. Reactive Red 218, C.I. Reactive Blue 72, C.I. Acid Blue 90, C.I. Acid Red 289, C.I. Acid Yellow 110, C.I. Direct Yellow 132, and C.I. Direct Blue 199. The results were similar to the results described above.

In addition, dyed products including a full-color image on a cloth were produced by using some of the ink jet textile printing inks, specifically, by using combinations of different color inks. The full-color images of the dyed products were vivid in both cases of using the inks immediately after preparation and of using the inks that were allowed to stand at 70° C. for 6 days. Also, the used inks exhibited favorable dyeing affinity.

Furthermore, ink jet textile printing inks were prepared in the same manner as in the Examples and Comparative Examples except for varying the contents of the constituents as follows: the water-soluble organic solvent content in the ink jet textile printing ink was varied in the range of 4.0% by mass to 30.0% by mass; the urea content was varied in the range of 0.50% by mass to 10.0% by mass; the ratio (XH/XW) of the water-soluble organic solvent content (XH (mass %)) to the water content (XW (mass %)) was varied in the range of 0.020 to 0.40. The thus prepared ink jet textile printing inks were evaluated in the same manner, and the evaluation results had the same tendency as the above-described results.

Furthermore, dyed products were produced in the same manner as above except that the ink jet apparatus having the structure shown in FIGS. 1 to 6 was replaced with an ink jet apparatus having the structure shown in FIGS. 7 to 17. The resulting dyed products were evaluated in the same manner, and the results had the same tendency as the above-described results. Also, the similar evaluation was performed under the same conditions except for varying the ratio of the circulation flow rate of the ink jet textile printing ink to the maximum ejection rate of the ink jet head in the range of 0.05 to 20. The results had the same tendency as the above-described results.

What is claimed is:

1. An ink jet textile printing ink comprising:
   5.0% by mass to 20.0% by mass of a water-soluble dye;
   water;
   a water-soluble organic solvent; and
   active carbon particles,
   wherein the active carbon particles include particles having a particle size of 50 nm to 1000 nm, and the active carbon particles having the particle size of 50 nm to 1000 nm are contained in a proportion of 500 to 300000 particles per milliliter.

2. The ink jet textile printing ink according to claim 1, wherein the active carbon particles include particles having a particle size of 50 nm to 200 nm, and the active carbon particles having the particle size of 50 nm to 200 nm are contained in a proportion of 2000 to 30000 particles per milliliter.

3. The ink jet textile printing ink according to claim 1, wherein the active carbon particles have an average particle size of 100 nm to 600 nm.

4. The ink jet textile printing ink according to claim 1, wherein the active carbon particles have a largest particle size of 10000 nm or less.

5. The ink jet textile printing ink according to claim 1, wherein the number of active carbon particles having a particle size of 2000 nm or more contained in 1 mL of the ink jet textile printing ink is 60000 or less.

6. The ink jet textile printing ink according to claim 1, wherein the ink jet textile printing ink is ejected from an ink jet head having a pressure chamber and a circulation path enabling the ink jet textile printing ink in the pressure chamber to be circulated.

7. The ink jet textile printing ink according to claim 6, wherein the ink jet textile printing ink is circulated at a flow rate with a ratio of 0.05:1 to 20:1 to the maximum ejection rate of the ink jet head.

8. The ink jet textile printing ink according to claim 1, wherein the active carbon particles consist of carbon.

* * * * *